(12) United States Patent
Tateishi et al.

(10) Patent No.: US 8,891,760 B2
(45) Date of Patent: Nov. 18, 2014

(54) SYSTEM FOR CHECKING ACCEPTANCE OF STRING BY AUTOMATON

(71) Applicant: International Business Machines Corporation, Armonk, NY (US)

(72) Inventors: Takaaki Tateishi, Tokyo (JP); Yuji Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 10 days.

(21) Appl. No.: 13/716,440

(22) Filed: Dec. 17, 2012

(65) Prior Publication Data

US 2013/0170638 A1 Jul. 4, 2013

(30) Foreign Application Priority Data

Dec. 16, 2011 (JP) ................................. 2011-276303

(51) Int. Cl.
*H04L 9/00* (2006.01)
*H04L 9/28* (2006.01)
(52) U.S. Cl.
CPC . *H04L 9/28* (2013.01); *H04L 9/008* (2013.01)
USPC .................................. 380/28; 380/29; 380/30
(58) Field of Classification Search
USPC .......................................................... 380/28
See application file for complete search history.

(56) References Cited

U.S. PATENT DOCUMENTS

2007/0104375 A1 5/2007 Furodet
2011/0202672 A1* 8/2011 Narayanaswamy et al. .. 709/230

FOREIGN PATENT DOCUMENTS

| EP | 2056221 | 5/2009 |
| WO | 2008135951 | 11/2008 |
| WO | 2012132910 | 10/2012 |

OTHER PUBLICATIONS

Pathak, et al, "Privacy Preserving Probabilistic Inference with Hidden Memory Markov Models", IEEE ICASSP, May 22, 2011, pp. 1-4.

* cited by examiner

*Primary Examiner* — Ghazal Shehni
(74) *Attorney, Agent, or Firm* — Jennifer R. Davis; Anne Vachon Dougherty

(57) ABSTRACT

A server having an automaton whose state transitions in accordance with received characters, determines whether the automaton has transitioned to a final state on the basis of the characters. The server receives a coding sequence from the client in the characters included in the string. The coding sequence elements corresponding to the characters are values encrypting a non-unity using a first encryption scheme having homomorphism, and whose elements not corresponding to the characters are values encrypting a unity using the first encrypting scheme. The server generates, in response to receiving the coding sequence, exchange data encrypting a subsequent state key corresponding to each of a plurality of previous states of the automaton on the basis of the coding sequence using the first encryption scheme; encrypts exchange data with the corresponding previous state key and sends the encrypted exchange data to the client.

18 Claims, 19 Drawing Sheets

Fig 6

| Previous State/Character | $x_0$ | $x_1$ | $x_2$ | $\cdots$ | $x_\sigma$ | $\cdots$ | $x_{|\Sigma|-1}$ |
|---|---|---|---|---|---|---|---|
| $q_0$ | $\cdots$ | $\cdots$ | $\cdots$ | $\cdots$ | $\cdots$ | $\cdots$ | $\cdots$ |
| $q_1$ | $\cdots$ | $\cdots$ | $\cdots$ | $\cdots$ | $\cdots$ | $\cdots$ | $\cdots$ |
| $q_2$ | $\cdots$ | $\cdots$ | $\cdots$ | $\cdots$ | $\cdots$ | $\cdots$ | $\cdots$ |
| $\vdots$ | $\vdots$ | $\vdots$ | $\vdots$ | $\vdots$ | $\vdots$ | $\vdots$ | $\vdots$ |
| $q_i$ | $\cdots$ | $\cdots$ | $\cdots$ | $\cdots$ | $q_j$ | $\cdots$ | $\cdots$ |
| $\vdots$ | $\vdots$ | $\vdots$ | $\vdots$ | $\vdots$ | $\vdots$ | $\vdots$ | $\vdots$ |
| $q_{|Q|-1}$ | $\cdots$ | $\cdots$ | $\cdots$ | $\cdots$ | $\cdots$ | $\cdots$ | $\cdots$ |

Subsequent State

Fig 7

Previous State Keys For Entered Characters

| Previous State | Previous State Key |
|---|---|
| $q_0$ | $S_0$ |
| $q_1$ | $S_1$ |
| $q_2$ | $S_2$ |
| ⋮ | ⋮ |
| $q_i$ | $S_i$ |
| ⋮ | ⋮ |
| $q_{|Q|-1}$ | $S_{|Q|-1}$ |

Fig 8

Subsequent State Key For Entered Characters

| Subsequent State | Subsequent State Key |
|---|---|
| $q_0$ | $r_0$ |
| $q_1$ | $r_1$ |
| $q_2$ | $r_2$ |
| ⋮ | ⋮ |
| $q_j$ | $r_j$ |
| ⋮ | ⋮ |
| $q_{|Q|-1}$ | $r_{|Q|-1}$ | ical field

The present invention relates to a server, client, method and program for checking whether or not a string has been accepted by an automaton.

BACKGROUND ART

A system is known for checking whether or not a string possessed by a client has been accepted by an automaton possessed by a server (see, for example, Laid-open Patent Publication No. 2009-151757).

SUMMARY OF INVENTION

However, it is very difficult to check whether or not a string has been accepted by an automaton without disclosing the string held by the client to the server and without disclosing the automaton held by the server to the client.

A first aspect of the present invention provides a server connectable to a client for input of a string, having an automaton whose state transitions in accordance with received characters, and determining whether the automaton has transition to a final state on the basis of the characters, in which the server includes: receiving from the client in the characters included in the string a coding sequence whose elements corresponding to the characters are values encrypting a non-unity using a first encryption scheme having homomorphism, and whose elements not corresponding to the characters are values encrypting a unity using the first encrypting scheme; generating, in response to receiving the coding sequence, exchange data encrypting a subsequent state key corresponding to each of a plurality of previous states of the automaton on the basis of the coding sequence using the first encryption scheme; encrypting exchange data with the corresponding previous state key; and sending the encrypted exchange data to the client. An information processing method and program are also provided for this server.

A second aspect of the present invention is a client connectable to a server having an automaton whose state transitions in accordance with received characters, receiving input of a string, and determining whether the automaton has transitioned to a final state on the basis of the string, in which the client includes: sending to the server, in the characters included in the string, a coding sequence whose elements corresponding to the characters are values encrypting a non-unity using a first encryption scheme having homomorphism, and whose elements not corresponding to the characters are values encrypting a unity using the first encrypting scheme; and receiving from the server, ciphertext encrypting exchange data using a corresponding previous state key, the exchange data generated, in response to receiving the coding sequence, to encrypt a subsequent state key corresponding to each of a plurality of previous states of the automaton on the basis of the coding sequence using the first encryption scheme. A program is also provided for this client.

It should be noted that the above summary of the present invention is not intended to enumerate all of the features required of the present invention. In addition, sub-combinations of these groups of characteristics also constitute the present invention.

BRIEF DESCRIPTION OF DRAWINGS

FIG. 6 shows an example of a transition table for an automaton possessed by the server 30 in the present embodiment;

FIG. 7 shows a key table including a plurality of previous state keys corresponding to previous states when a certain character is inputted;

FIG. 8 shows a key table including a plurality of subsequent state keys corresponding to subsequent states when a certain character is inputted;

DETAILED DESCRIPTION OF THE INVENTION

The following is an explanation of the present invention with reference to an embodiment of the present invention. However, the present embodiment does not limit the present invention in the scope of the claims. Also, all combinations of characteristics explained in the embodiment are not necessarily required in the technical solution of the present invention.

Figure 1:
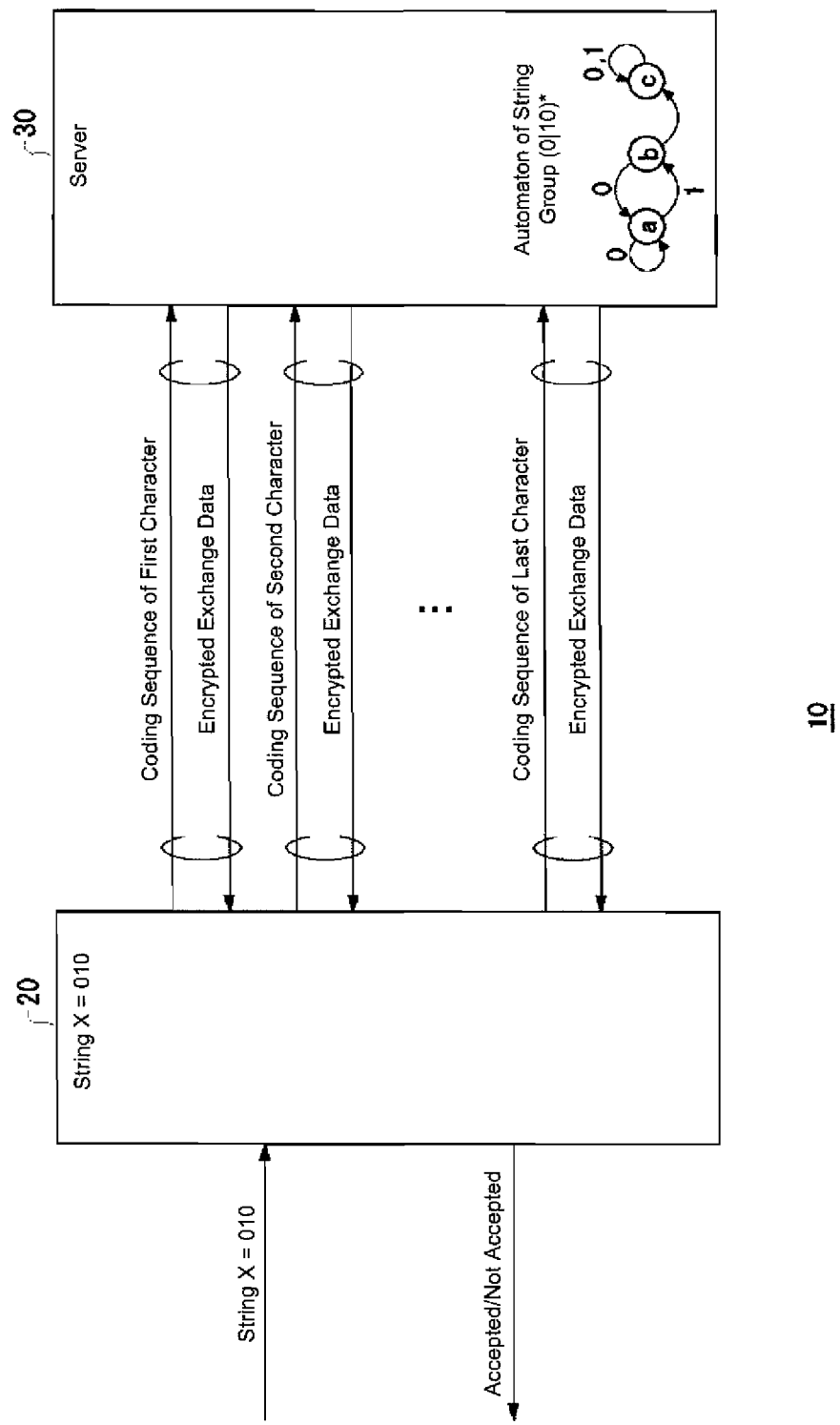
FIG. 1 shows the configuration of the checking system 10 in the present embodiment.

FIG. 1 shows the configuration of the checking system 10 in the present embodiment. The checking system 10 in the present embodiment includes a client 20 and a server 30. The checking system 10 in the present embodiment determines whether or not an automaton possessed by the server 30 has transitioned to the correct final state on the basis of the string inputted to the client 20.

The client 20 inputs a string from an external unit. The characters included in the string can be any type of character. For example, they can be binary values with "0" and "1", or characters represented by a single byte.

The server 30 has an automaton whose state transitions in response to a received character. The character received by the automaton is a character inputted to the client 20. The automaton represents the regular expression of a set of pre-registered strings (group of strings). The automaton successively receives each character in the string from the beginning, and successively transitions states with each character from the first character. After the automaton has received the final character and made a transition, it outputs "accepted" if the transition has been made to the proper final state or "not accepted" if the transition has not been made to the proper final state.

The client 20 generates a coding sequence corresponding to each inputted character, and sends a coding sequence to the server 30 for each inputted character in the string. A coding sequence is explained in greater detail below.

In response to receiving a coding sequence from the client 20, the server 30 generates and sends to the client 20 encrypted exchange data. Exchange data is explained in greater detail below. The client 20 and the server 30 exchange coding sequences and encrypted exchange data for every inputted character in the string.

Beginning with the first character, the client 20 successively decrypts the encrypted exchange data received for each character. When the exchange data for the final character has been decrypted, and the value indicating acceptance has been decrypted from the exchange data for the final character, the client 20 determines on the basis of the inputted string that the automaton has made the transition to the proper final state. In this way, the checking system 10 in the present embodiment can determine whether an automaton possessed by a server 30 has made the transition to the proper final state on the basis of a string inputted to a client 20.

Figure 2:
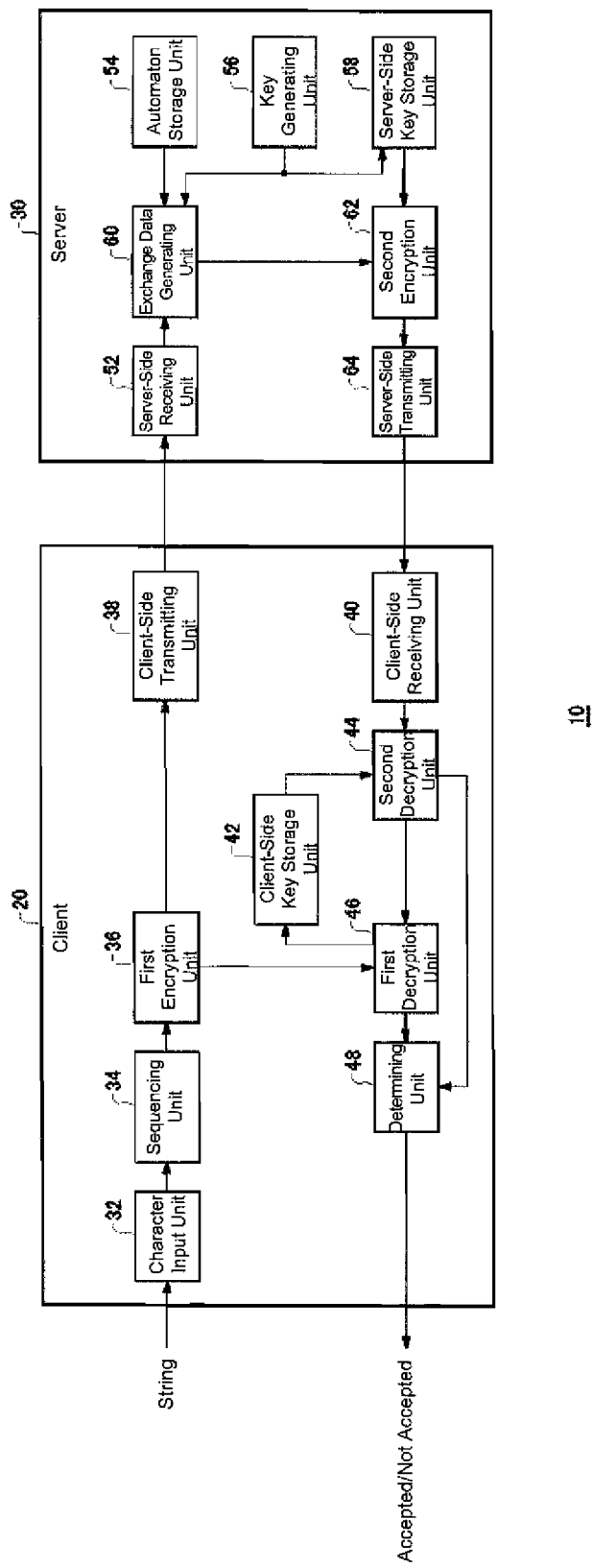
FIG. 2 shows a functional block configuration of the client 20 and the server 30 in the present embodiment.

FIG. 2 shows a functional block configuration of the client 20 and the server 30 in the present embodiment. The client 20 has a character input unit 32, a sequencing unit 34, a first encryption unit 36, a client-side transmitting unit 38, a client-side receiving unit 40, a client-side key storage unit 42, a second decryption unit 44, a first decryption unit 46, and a determining unit 48. Also, the server 30 has a server-side receiving unit 52, an automaton storage unit 54, a key generating unit 56, a server-side key storage unit 58, an exchange data generating unit 60, a second encryption unit 62, and a server-side transmitting unit 64.

The character input unit 32 inputs each character included in a string one character at a time beginning with the first character. The sequencing unit 34 generates a sequence in response to a character inputted by the character input unit 32 in which one element specifying the character is rendered as a non-unity, and in which the elements not specifying the character are rendered as a unity. A sequence will be explained below in greater detail with reference to FIG. 3.

The first encryption unit 36 encrypts the elements included in the sequence generated by the sequencing unit 34 using a first encryption scheme having homomorphism. A first encryption scheme and coding sequence will be explained in greater detail below with reference to FIG. 3. The client-side transmitting unit 38 associates a coding sequence generated by the first encryption unit 36 with a character, and sends the associated coding sequence to the server 30.

In this way, the client 20, in response to a character, sends to the server 30 a coding sequence in which the element identifying the character is a value in which a non-unity has been encrypted using a first encryption scheme having homomorphism, and in which the elements not identifying the character are values in which a unity has been encrypted using the first encryption scheme.

The server-side receiving unit 52 receives the coding sequence from the client 20. The automaton storage unit 54 stores an automaton for determining whether or not a string inputted to the client 20 has been accepted.

A key generating unit 56 generates a subsequent state key corresponding to the subsequent states of the automaton in response to each character in the string inputted to the client 20. A subsequent state key is explained below in greater detail with reference to FIG. 5.

The server-side key storage unit 58 stores the subsequent state keys associated with the subsequent states of the automaton as previous state keys corresponding the previous states when the next character has been inputted. A previous state key is explained below in greater detail with reference to FIG. 5.

The exchange data generating unit 60, in response to receiving a coding sequence, raises each element in the received coding sequence to the power of the subsequent state key corresponding to the subsequent state transitioned to from the previous state, which corresponds to the previous states of the automaton, in response to the input of a character specified by an element. Then, the exchange data generating unit 60 generates exchange data in which the subsequent state key has been encrypted using the first encryption scheme by combining the elements raised to the power of the subsequent state key using an operation corresponding to the first encryption scheme. Also, the exchange data generating unit 60 generates, in accordance with the states of the automaton, final state data indicating an "accepted" value if the state is the proper final state, and a "not accepted" value if the state is not the proper final state. The method for generating exchange data will be explained in detail below with reference to FIG. 9.

The second encryption unit 62 encrypts the exchange data generated for the previous states of the automaton using the corresponding previous state key. Also, the second encryption unit 62 encrypts the final state data for each of the states of the automaton using the subsequent state key corresponding to the final character in the string. The encryption process of the exchange data will be explained in detail below with reference to FIG. 5. In response to receiving a coding sequence, the server-side transmitting unit 64 sends encrypted exchange data to the client 20.

In this way, the server 30, in response to receiving a coding sequence, generates exchange data in which the subsequent state key has been encrypted using the first encryption scheme based on the coding sequence and in accordance with the previous states of the automaton, encrypts the exchange data using the corresponding previous state key, and sends the encrypted exchanged data to the client 20.

The client-side receiving unit 40 receives encrypted exchange data from the server 30 in response to sending a coding sequence corresponding to a character. Also, the client-side receiving unit 40 receives the encrypted final state data in accordance with each state of the automaton. The client-side key storage unit 42 stores a single previous state key corresponding to each character in a string. More specifically, the key storage unit 42 acquires and stored in advance a single previous state key for the first character in the string. In response to receiving each character other than the first character in the string, the client-side key storage unit 42 stores as the previous state key the subsequent state key corresponding to the character previously decrypted by the first decryption unit 46.

The second decryption unit 44 decrypts the encrypted exchange data received by the client-side receiving unit 40 using the previous state key for the corresponding character stored in the client-side key storage unit 42. The second decryption unit 44 can decrypt only one set of exchange data among the sets of exchange data when the character is correct.

The first decryption unit 46 decrypts the subsequent state key using the first encryption scheme from the one set of exchange data decrypted from among the sets of exchange data by the second decryption unit 44. In other words, the first decryption unit 46 decrypts the subsequent state key from the one set of exchange data decrypted by the second decryption unit 44 using the decryption key corresponding to the encryption key used in the first encryption scheme by the first encryption unit 36 to encrypt the elements of the sequence corresponding to the character.

The first decryption unit 46 decrypts the final state data using the decrypted final state key after the decrypting corresponding to the final character in the string has been completed. The first decryption unit 46 writes the decrypted subsequent state key to the client-side storage unit 42 as the previous state key for the next character when the decrypting corresponding to a character other than the final character in the string has been completed. The first decryption unit 46 passes the "accepted" or "not accepted" value to the determining unit 48 when the final state data and the "accepted" or "not accepted" value have been decrypted.

Whenever the second decryption unit 44 cannot decrypt exchange data in the middle of a string or a "not accepted" value has been decrypted by the first decryption unit 46, the determining unit 48 determines on the basis of the inputted string that the automaton possessed by the server 30 has not transitioned to the proper final state. When the first decryption unit 46 has decrypted an "accepted" value, the determining unit 48 determines on the basis of the inputted string that the automaton possessed by the server 30 has transitioned to the proper final state.

In this way, the client 20 decrypts in successive order from the first character the received encrypted exchange data corresponding to the characters. When the exchange data corresponding to the final character has been decrypted and data indicating acceptance has been received, the client 20 determines that the automaton has transitioned to the proper final state in response to the inputted string. In this way, the checking system 10 can determine whether an automaton possessed by a server 30 has transitioned to the final transition state on the basis of a string inputted to a client 20.

Figure 3:
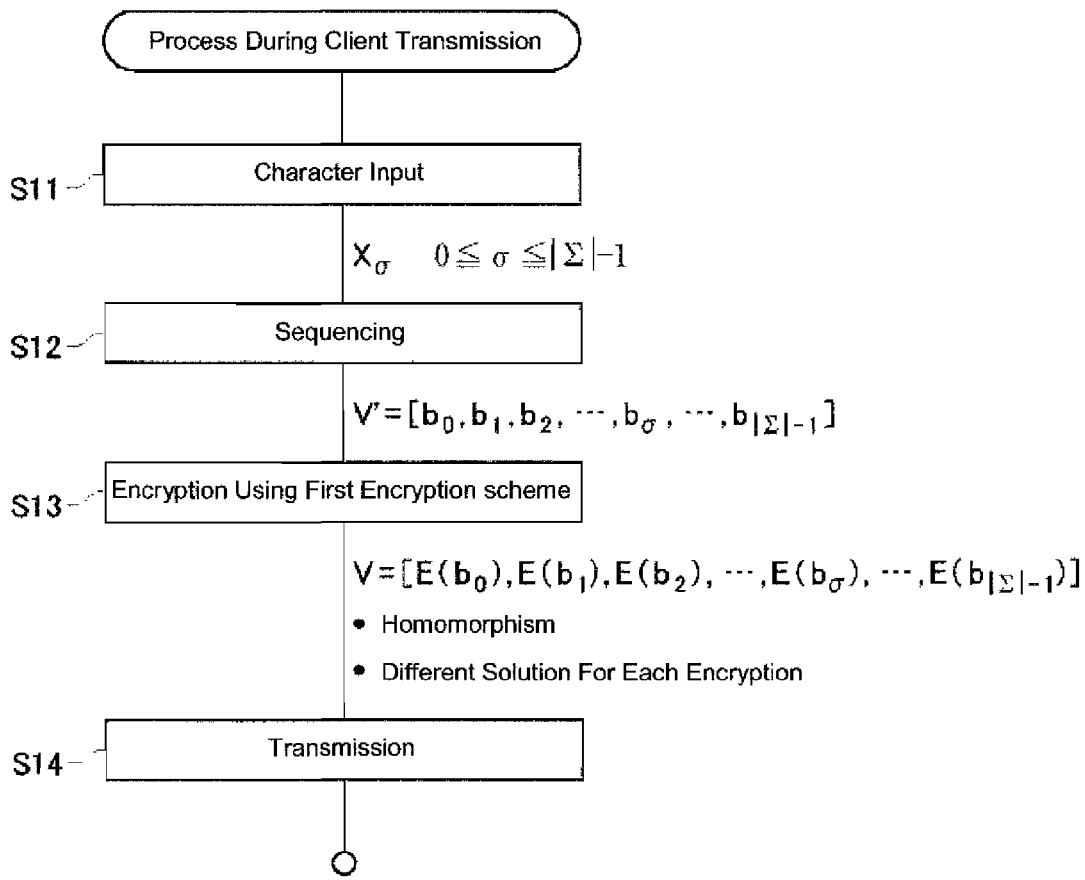
FIG. 3 shows a flowchart of processing performed by the client 20 in the present embodiment.
Figure 4:
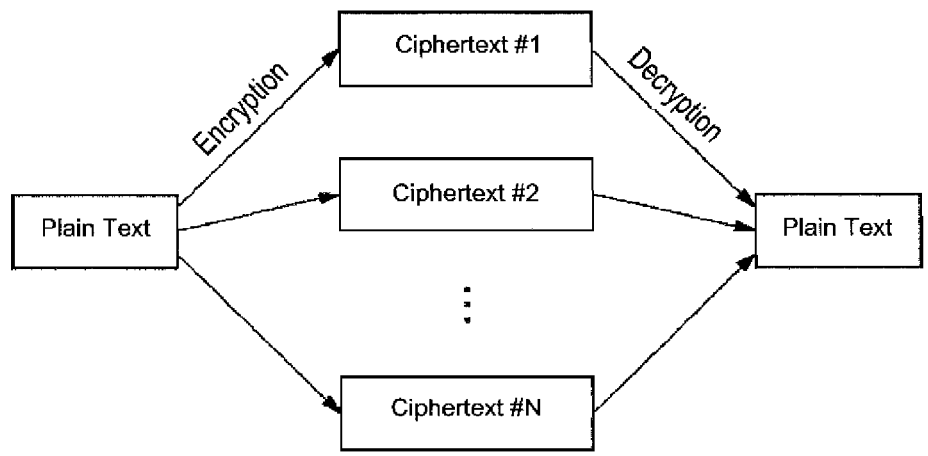
FIG. 4 shows an example of ciphertext generated using the first encryption scheme.

FIG. 3 shows a flowchart of processing performed by the client 20 in the present embodiment. FIG. 4 shows an example of ciphertext generated using the first encryption scheme.

When a string is inputted, the client 20 selects the characters in the inputted string one at a time, and executes the processing from Step S11 to Step S14 on each of the characters.

First, in Step S11, the client 20 inputs a character. In the present embodiment, the character $X_\sigma$ specified as the $\sigma^{th}$ character (index a) in the set $\Sigma$ of input-able characters is inputted. For example, when the characters are expressed using a single byte, the client 20 inputs any character from the $0^{th}$ to the $255^{th}$.

Next, in Step S12, the client 20 converts the inputted character to sequence V'. More specifically, the client 20 prepares a sequence including elements for $|\Sigma|$ number of characters in the set $\Sigma$ of input-able characters. For example, when a character expressed by a single byte is inputted, the prepared sequence includes 256 elements.

The prepared sequence has a one-to-one correspondence to the characters included in the set $\Sigma$. For example, if a character is expressed by single bit (a character expressed by "0" or "1"), there are two elements in the sequence, and the first element corresponds to "0" and the second element corresponds to "1".

The client 20 then uses the prepared sequence to generate a sequence in which an element specifying a character inputted by the character input unit 32 is a non-unity and elements not specifying one of these characters are unities. Here, a unity is a unity in a binary operation corresponding to the first encryption scheme described below. This will be described in greater detail below, but the unity is "0" or a unity in an addition operation, and a non-unity is a predetermined numerical value other than "0" (for example, "1") when the first encryption scheme is an encryption scheme having additive homomorphism. The unity is "1" or a unity in a multiplication operation, and a non-unity is a predetermined numerical value other than "1" when the first encryption scheme is an encryption scheme having a multiplicative homomorphism.

In the present embodiment, the first encryption scheme is an encryption scheme having additive homomorphism. Thus, as shown in Equation 11 below, the client 20 generates coding sequence V' in which the element specifying character $X_\sigma$ (element $b_\sigma$ in index σ) is "1", and the elements not specifying a character (the elements other than those of index σ) are "0".

Equation 1

Element Specifying Character

Another Element | Another Element $$V' = [b_0, b_1, b_2, \ldots, b_\sigma, \ldots, b_{|\Sigma|-1}]$$
$$= [0, \ 0, \ 0, \ldots, \ 1, \ldots, \ 0\ ] \quad (11)$$

Note that $b_x$ represents values of the elements in index x included in the sequence. Here, x is an integer within the range $0 \le x \le (|\Sigma|-1)$. Also, a is the index specifying character $X_\sigma$ in character set $\Sigma$, and is an integer within the range $0 \le \sigma \le (|\Sigma|-1)$.

Next, in Step S13, the client 20 encrypts uses the first encryption scheme each of the elements included in the sequence generated by the sequencing unit 34 to generate code sequence V. In this way, client 20 can generate, in accordance with the character, a code sequence in which the element specifying the character is a value obtained by encrypting a non-unit using the first encryption scheme, and the values not specifying the character are values obtained by encrypting a unit using the first encryption scheme.

The first encryption scheme is a public key encryption scheme satisfying identification difficulties (IND-CPA) with respect to selective plaintext attacks, and having homomorphism (additive homomorphism or multiplicative homomorphism). For example, ciphertext of an encryption scheme having additive homomorphism has the characteristics indicated in Equation (12) below. Here, $m_1$, $m_2$, and m represent plaintext.

Equation 2

$$E(m_1) \cdot E(m_2) = E(m_1 + m_2)$$

$$(E(m))^k = E(k \cdot m) \quad (12)$$

In an encryption scheme having additive homomorphism, when two ciphertexts $E(m_1)$, $E(m_2)$ are provided, the results of adding the ciphertexts together ($E(m_1) \cdot E(m_2)$) are the same as the ciphertext ($E(m_1+m_2)$) obtained by performing the encryption after adding together the plaintexts. Also, the result of raising the ciphertext to the power of a given numerical value k (($E(m))^k$) is the same as ciphertext ($E(k \cdot m)$) obtained by performing the encryption after raising the plaintext to the power of the numerical value k.

Also, the first encryption scheme, for example, as shown in FIG. 4, is a scheme in which the ciphertext is different in each encryption operation even when the same ciphertext is encrypted. In other words, in the first encryption scheme, ciphertext obtained a first time by encrypting a given plaintext using an encryption key is different from ciphertext obtained a second time by encrypting the same plaintext using the same encryption key. However, the same plaintext can be decrypted using the two ciphertexts obtained the first and second times. In this way, the client 20 can eliminate the need to determine whether each element in a sequence is ciphertext obtained by encrypting a unity or ciphertext obtained by encrypting a non-unity.

An encryption scheme known to have these characteristics is an expansion ElGamal encryption scheme. In the present embodiment, the client 20 generates the coding sequence shown in Equation (13) below using an expansion ElGamal encryption scheme as the first encryption scheme.

Equation 3

$$\begin{aligned} V &= [E(b_0), E(b_1), E(b_2), \ldots, E(b_\sigma), \ldots, E(b_{|\Sigma|-1})] \\ &= [E(0), E(0), E(0), \ldots, E(1), \ldots, E(0)] \end{aligned} \quad (13)$$

In other words, in the present embodiment, the client 20 generates encrypting sequence V in which the element specifying character $X_\sigma$ (an element in index σ) is ciphertext in which "1" has been encrypted using the expansion ElGamal encryption scheme, and the elements not specifying a character (the elements other than those of index σ) are ciphertext in which "0" has been encrypted using the expansion ElGamal encryption scheme.

Next, in Step S14, the client 20 sends the generated coding sequence to the server 30. In this situation, the client 20 sends a coding sequence in which the order of the characters corresponding to the string is known. For example, the client 20 sends the encrypting sequences in the order of the characters. The client 20 can send an encrypting sequence along with an index indicating the order of the characters.

Figure 5:
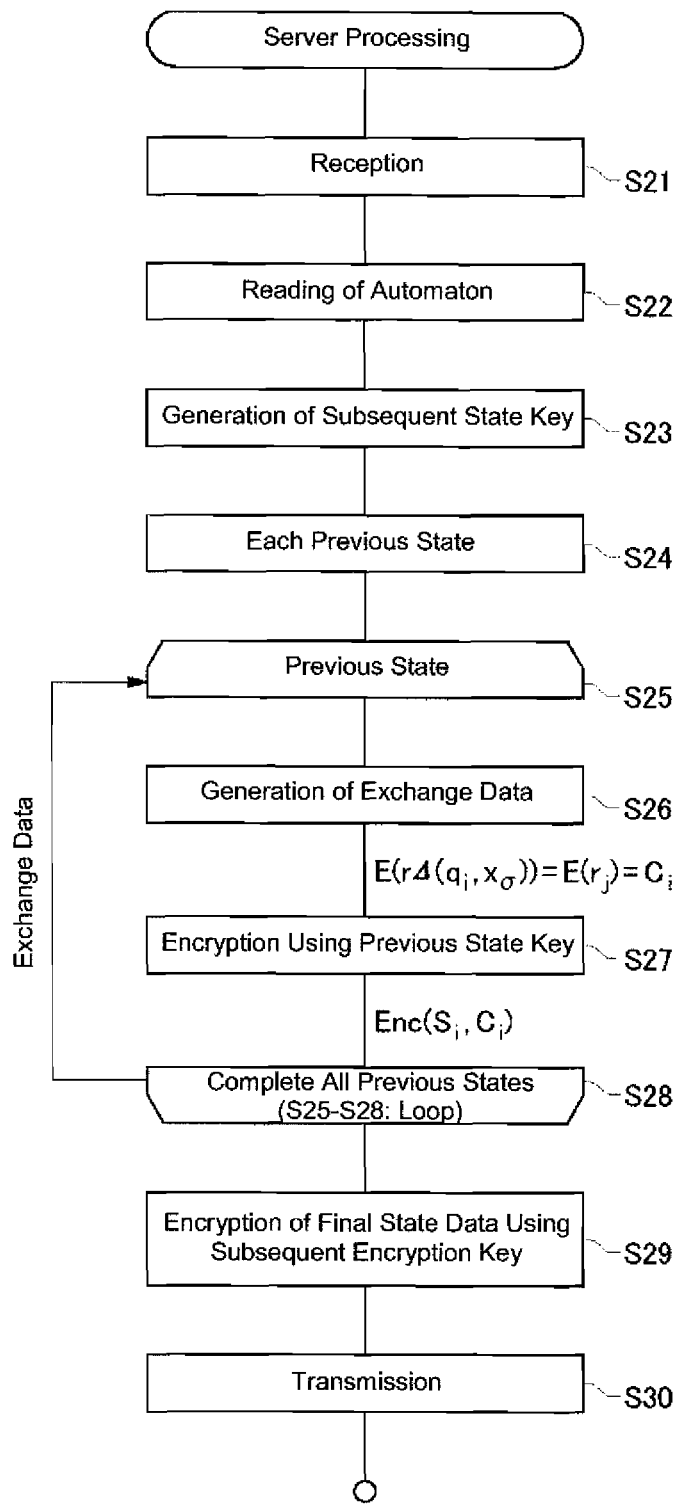
FIG. 5 shows a flowchart of processing performed by the server 30 in the present embodiment.

FIG. 5 shows a flowchart of processing performed by the server 30 in the present embodiment. FIG. 6 shows an example of a transition table for an automaton possessed by the server 30 in the present embodiment. FIG. 7 shows a key table including a plurality of previous state keys corresponding to previous states when a certain character is inputted. FIG. 8 shows a key table including a plurality of subsequent state keys corresponding to subsequent states when a certain character is inputted.

First, in Step S21, the server 30 receives a coding sequence corresponding to each of the characters from the client 20. The server 30 executes the processing from Step S22 to Step S30 on a received coding sequence. In this situation, the server 30 executes the processing from Step S22 to Step S30 on each character in sequential order beginning with the coding sequence corresponding to the first character.

For example, the server 30 executes the processing from Step S22 to Step S30 on the coding sequences in the order received when coding sequences are sent from the client 20 in the order of the characters. Also, the server 30 executes the processing from Step S22 to Step 33 on the coding sequences in the order of the index when the coding sequences are send from the client 20 along with an index indicating the order of the characters.

Next, in Step S22, the server 30 reads the automaton. The automaton includes a transition table representing the state transitions, a group of states, the initial state, and the proper final state. The transition of states performed by the automaton is represented, for example, in the transition table shown in FIG. 6. The server 30 can reference this transition table to identify the next state (subsequent state) to be transitioned to from the current state (previous state) when a given character is provided.

In the present embodiment, the automaton has, for example, (|Q|) states represented by $q_0$-$q_{|Q|-1}$. Also, in the present embodiment, the automaton can accept (|Σ|) characters from $x_0$ to $x_{|\Sigma|-1}$. The automaton in the present embodiment transitions to the $j^{th}$ subsequent state $q_j$ when the $\sigma^{th}$ character $x_\sigma$ is provided in the $i^{th}$ previous state $q_i$. Here, i and j are integers between 0 and state number (|Q|−1).

Next, in Step S23, the server 30 reads the previous state keys corresponding to the previous states. In the present embodiment, the server 30, as shown in FIG. 7, is storing previous state keys $S_0$-$S_{|Q|-1}$ corresponding to previous states $q_0$-$q_{|Q|-1}$, and retrieves them. These previous state keys are the same as the subsequent state keys for the previous characters, and the values change each time a character is inputted. The previous state key corresponding to the initial character is generated beforehand. In the present embodiment, the server 30 reads previous state key $S_j$ corresponding to the $i^{th}$ previous state $q_i$ when a character is inputted.

Next, in Step S24, the server 30 generates subsequent state keys for each subsequent state. Here, the subsequent state keys are random numbers associated with the subsequent states of the automaton. In the present embodiment, the server 30, as shown in FIG. 8, generates subsequent state keys $r_0$-$r_{|Q|-1}$ for each of the subsequent states $q_0$-$q_{|Q|-1}$. These subsequent state keys have values that change each time a character is inputted. In the present embodiment, for example, the server 30 reads subsequent state key $r_j$ for the $j^{th}$ subsequent state $q_j$ when a character is inputted.

Next, from Step S25 to Step S28, the server 30 executes the loop processing for each previous state. In the present embodiment, the server 30 executes the processing in Step S26 and Step S27 for each of the previous states $q_0$-$q_{|Q|-1}$.

In Step S26, the server 30 generates exchange data in which a subsequent state key, which corresponds to the subsequent state transitioned to from the previous state in response to a character corresponding to the coding sequence being inputted, is encrypted using the first encryption scheme. For example, let the previous state be $q_i$, and the character corresponding to the received coding sequence be $X_\sigma$ (in other words, the received coding sequence is generated from character $X_\sigma$). In this case, the subsequent state transitioned to in response to character $X_\sigma$ being inputted in previous state $q_i$ is $q_j$ as indicated in FIG. 6. Also, the subsequent state key corresponding to subsequent state $q_j$ is $r_j$ as shown in FIG. 8.

Therefore, the server 30, as shown in Equation (14), generates as exchange data $C_i$ ciphertext in which $r_j$ is encrypted with the first encryption scheme, when the previous state is $q_i$ and the character corresponding to the received coding sequence is $X_o$. The method for generating exchange data will be explained in greater detail with reference to FIG. 9.

Equation 4

Exchange Data for Subsequent State $qi$(Subsequent State Key $rj$)=$E(r_j)$=$C_j$ (14)

Next, in Step S27, the server 30 encrypts the generated exchange data using the corresponding previous state key. In this case, the server 30 encrypts the exchange data using a private key encryption scheme using a message authentication code (MAC). In the present embodiment, the server 30, for example, encrypts the exchange data using a Diffie-Hellman key.

In Step S28, the server 30 skips the loop and advances the process to Step S29 when the processing in Step S26 and Step S27 has been performed on all of the previous states.

Next, the server 30 executes the processing in Step S29 when a coding sequence corresponding to the final character of the string has been received. The server 30 skips the processing in Step S29 and advances the process to Step S30 when the coding sequence corresponding to a character other than the final character in the string has been received.

In Step S29, when the coding sequence corresponding to the final character of the string has been received, the server 30 generates final state data representing a value indicating "accepted" of the state is the proper final state among the states of the automaton or a value indicating "not accepted" if the state is not the proper final state. Then, the server 30 encrypts the final state data generated for the states of the automaton using the generated subsequent state key corresponding to the final character of the string.

Next, in Step S30, the server 30 sends to the client 20 the exchange data generated and encrypted for all of the previous states. Also, the server 30 sends to the client final state data generated and encrypted for the states when the coding sequence corresponding to the final character has been received. In this case, the server 30 randomly sorts and sends for each coding sequence the exchange data encrypted for each of the previous states of the automaton. Also, in this case, the server 30 sends to the client 20 encrypted exchange data so the order of characters associated with the received coding sequence is understood. The server 30, for example, sends to the client 20 encrypted exchange data to which an index indicating the order of the characters or information identifying the corresponding coding sequences has been added.

In the present embodiment, exchange data $C_0$-$C_{|Q|-1}$ is generated corresponding to previous states $q_0$-$q_{|Q|-1}$. In this case, the server 30, as shown in Equation (15), encrypts the exchange data $C_0$-$C_{|Q|-1}$ using the corresponding previous state key $S_0$-$S_{|Q|-1}$. Enc(x, y) represents the encrypting of data y with Diffie-Hellman key x.

Equation 5

$Enc(S_0, C_0)$
$Enc(S_1, C_1)$
$\vdots$
$Enc(S_i, C_i)$ (15)
$\vdots$
$Enc(S_{|Q|-1}, C_{|Q|-1})$ When the processing of the final character in the string has been completed, the server 30 ends the flow. When the processing of a character other than the final character in the string has been completed, the server 30 in Step S30 stores the subsequent state keys $r_0$-$r_{|Q|-1}$ corresponding to the subsequent states $q_0$-$q_{|Q|-1}$ as the previous state keys for the next character. Then, the server 30 returns to the beginning of the process and executes the process on the coding sequences associated with the next character.

Figure 9:
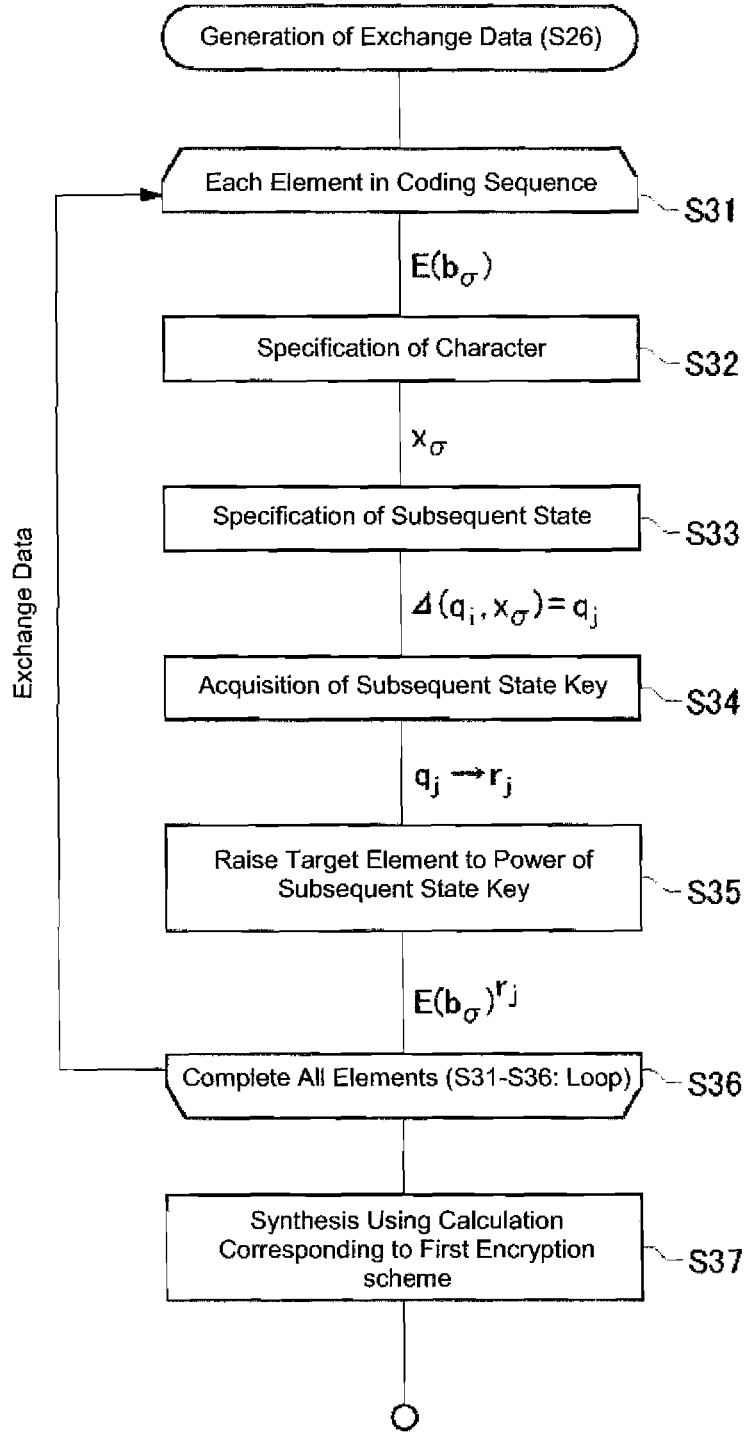
FIG. 9 shows a flowchart of the exchange data generating process performed by the server 30 in the present embodiment.

FIG. 9 shows a flowchart of the exchange data generating process performed by the server 30 in the present embodiment. Server 30 executes the processing from Step S31 to Step S37 explained below as the exchange data generating process in Step S26 of FIG. 5.

First, in Step S31 to Step S36, the server 30 executes the loop processing for each element in the received coding sequence. In the present embodiment, the server 30 executes the processing from Step S32 to Step S35 for each element from the $0^{th}$ element to the $(|\Sigma|-1)^{th}$ element.

In Step S32, the server 30 specifies the character corresponding to the element to be processed. For example, there are two elements in the coding sequence when a character expressed by a single bit is inputted. In this case, for example, the server 30 specifies "0" as the character corresponding to the element when the first element in the coding sequence is to be processed, and specifies "1" as the character corresponding to the element when the second element in the coding sequence is to be processed. Here, let server 30 specify character $X_o$ corresponding to the $o^{th}$ element.

Next, in Step S33, the server 30 specifies the subsequent state to be transitioned to from the previous state in response to the character specified by the element being inputted on the basis of the previous state and the specified character to be processed. Here, let the previous state to be processed by the server 30 be $q_i$. In this case, the server 30 refers to the transition table for the automaton (for example, the transition table in FIG. 6), and specifies $q_j$ as the subsequent state to be transitioned to from previous state $q_i$ in response to the input of character $X_o$.

Next, in Step S34, the server 30 selects from the subsequent state keys generated in Step S24 the subsequent state key corresponding to the specified subsequent status $q_j$. Here, the server 30 selects $r_j$ from the table of generated subsequent state keys (for example, the table in FIG. 8) as the subsequent state key corresponding to subsequent state $q_j$.

Next, in Step S35, the server 30 raises the target element to the power of the subsequent state key $r_j$. Here, $o^{th}$ element $E(b_o)$ is raised to the power of subsequent state key $r_j$ as shown in Equation (16).

Equation 6

$E(b_o)^{r_j} = E(b_o \times r_j)$ (16)

As a result, because of the characteristics of the first encryption scheme (additive homomorphism), the value ($b_o \times r_j$) obtained by raising the value ($b_o$) prior to encryption of the element using the first encryption scheme to the power of the subsequent state key $r_j$ is the same as the ciphertext encrypted using the first encryption scheme.

Next, in Step S36, the server 30 skips the loop and advances the process to Step S37 when the processing from Step S32 to Step S35 has been performed on all of the elements included in the coding sequence.

In Step S37, the server 30 combines the elements raised to the power of the subsequent state keys using an operation corresponding to the first encryption scheme. The server 30 uses the results of this combination as the exchange data corresponding to the subsequent state.

In the present embodiment, the first encryption scheme is an encryption scheme having additive homomorphism, so the server combines the elements raised to the power of the subsequent status keys using an addition operation. If the first encryption scheme were an encryption scheme having a multiplicative homomorphism, the server 30 would combine the elements using a multiplication operation.

As shown in Equation (17), an addition operation is performed on the elements from the $0^{th}$ element to the $(|\Sigma|-1)^{th}$ element to generate exchange data. Here, $b_0$, $b_1$, . . . , $b_\sigma$, . . . , $b_{(|\Sigma|-1)}$ represent the values of the elements before encryption using the first encryption scheme. Also, $r\Delta(q_i, x_0)$, $r\Delta(q_i, x_1)$, . . . , $r\Delta(q_i, x_\sigma)$, . . . , $r\Delta(q_i, x_{|\Sigma|-1})$ represent the subsequent state keys used to raise the power of the elements.

Equation 7

$$\text{Exchange Data} = E(b_0 \times r\Delta(q_i, x_0)) \quad (17)$$
$$E(b_1 \times r\Delta(q_i, x_1))$$
$$\vdots$$
$$E(b_\sigma \times r\Delta(q_i, x_\sigma))$$
$$\vdots$$
$$E(b_{|\Sigma|-1} \times r\Delta(q_i, x_{|\Sigma|-1}))$$

In the coding sequence, the element specifying the character is a value obtained by encrypting a non-unity using the first encryption scheme, and the elements not specifying the character are values obtained by encrypting a unity using the first encryption scheme. For example, the first encrypting scheme has an additive homomorphism, and the coding sequence V, as shown in Equation (18), includes "1" which is a non-unity of the addition operation for the element $b_\sigma$ corresponding to character $X_\sigma$, and "0" which is a unity of the addition operation for the elements other than element $b_\sigma$ corresponding to character $X_\sigma$.

Equation 8

$$V = [E(b_0), E(b_1), E(b_2), \ldots, E(b_\sigma), \ldots, E(b_{|\Sigma|-1})] \quad (18)$$
$$= [E(0), E(0), E(0), \ldots, E(1), \ldots, E(0)]$$

Therefore, when the elements in Equation (18) are plugged into Equation (17), the exchange data is converted as shown in Equation (19) below. In other words, all of the elements other than the element corresponding to character $X_\sigma$ are 0, and the element corresponding to character $X_\sigma$ is the value of the subsequent state key. As a result, the exchange data is ciphertext ($E(r_j)$) in which the first encryption scheme has been used to encrypt the subsequent state key $r_j$ corresponding to subsequent state $q_j$ transitioned to from previous state $q_i$ in response to the input of character $X_\sigma$ corresponding to the coding sequence.

Equation 9

$$\text{Exchange Data} = E(0) \cdot E(0) \cdot \ldots \cdot E(r\Delta(q_i, x_\sigma)) \cdot \ldots \cdot E(0) \quad (19)$$
$$= E(r\Delta(q_i x_\sigma))$$
$$= E(r_j)$$

As described above, the server 30 can execute the processing from Step S31 to Step S37 to generate exchange data in which the first encryption key is used to encrypt the subsequent state key corresponding to the subsequent state transitioned to from the previous state in response to the input of a character corresponding to the coding sequence.

Figure 10:
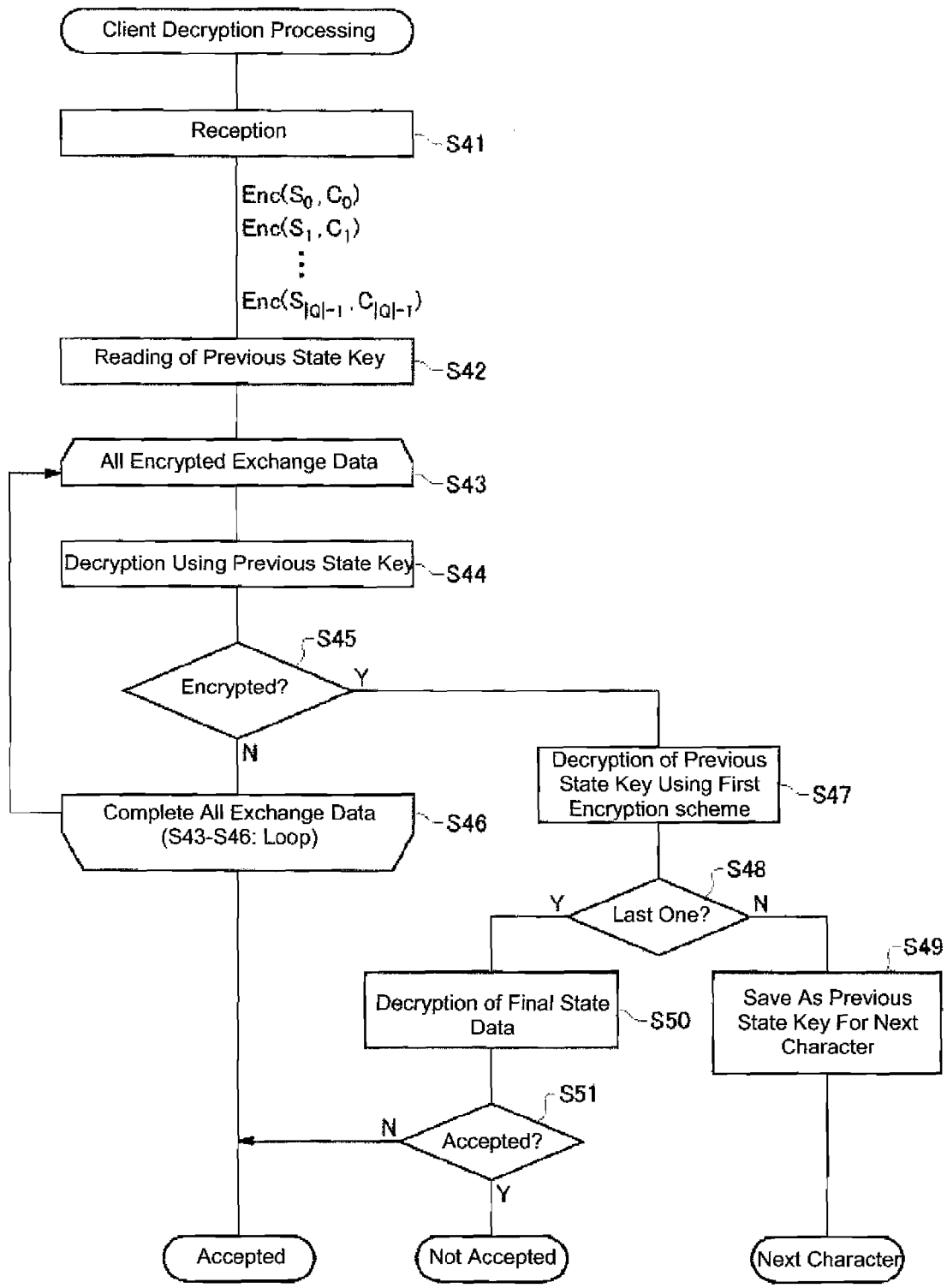
FIG. 10 shows a flowchart of the decryption process performed by the client 20 in the present embodiment.

FIG. 10 shows a flowchart of the decryption process performed by the client 20 in the present embodiment.

First, in Step S41, the client 20 receives encrypted exchange data from the server 30 in response to receiving a coding sequence corresponding to a character included in the string. Also, when the coding sequence corresponding to the last character in the string is sent, the client 20 receives encrypted final state data along with the encrypted exchange data. The client 20 executes the processing from Step S42 to Step S51 on the encrypted exchange data that was received. In this case, the client 20 executes processing on the encrypted exchange data according to the order of the corresponding characters.

Next, in Step S42, the client 20 reads and stores the previous state key associated with the corresponding character. The client 20, for example, receives from the server 30 and stores beforehand the previous state key corresponding to the first character in the string. Also, the client 20 stores the subsequent state key corresponding to the previous character as the previous state key for the characters other than the first character in the string.

Next, the client 20 executes the loop processing from Step S43 to Step S46 for every set of exchange data. In Step S44, the client 20 decrypts the encrypted exchange data to be processed using the retrieved previous state key.

Here, the client 20 can decrypt one set of the encrypted exchange data if the automaton has transitioned properly to another state when the corresponding character has been inputted. If the automaton has transitioned properly to another state when the corresponding character has been inputted, the client 20 cannot decrypt any more of the encrypted exchange data.

Next, in Step S45, the client 20 determines whether or not the exchange data could be decrypted (Step S45). When decryption was possible (Yes in Step S45), the client 20 advances the process to Step S47. When decryption was not possible (No in Step S45), the client 20 advances the process to Step S46.

In Step S46, the client 20 determines whether or not the processing in Step S44 and Step S45 has ended for all of the exchange data. When the processing has still not ended for some of the exchange data, the client 20 returns the process to Step S43, and executes the processing from Step S44 to Step S45 on the next set of exchange data. When the processing has been ended for all of the exchange data, that is, when some of the exchange data could not be decrypted, the client 20 determines that the automaton possessed by the server 30 could not transition to the proper final state on the basis of the inputted string (not accepted), and the flow ends.

If the exchange data could be decrypted (Yes in Step S45), the client 20 in Step S47 further decrypts the decrypted exchange data using the first encryption scheme to decrypt the subsequent state key. In other words, the client 20 decrypts the subsequent state key in the decrypted exchange data using a decryption key corresponding to the encryption key used when the elements in the coding sequence corresponding to the character were encrypted using the first encryption scheme.

Next, in Step S48, the client 20 determines whether or not the processing corresponded to the final character (Step S48). When it has been determined that the processing did not correspond to the final character (No in Step S48), the processing advances to Step S49. In Step S49, the client 20 saves the decrypted subsequent state key as the previous state key corresponding to the next character. Then, when the processing in Step S49 has ended, the client 20 repeats the processing from Step S41 in order to perform the processing corresponding to the next character.

When the client 20 has determined that the processing corresponds to the final character (Yes in Step S49), the process is advanced to Step S50. In Step S50, the client 20 decrypts the final state data using the decrypted subsequent state key. In this case, the client 20 decrypts the final state data one set at a time. Next, in Step S51, the client 20 determines whether the "accepted" value has been decrypted in the decrypted final state data.

When it has been determined that the "accepted" value has not been decrypted (No in Step S51), the client 20 determines that the automaton possessed by the server 30 has not transitioned to the proper final state on the basis of the inputted string (not accepted), and the flow ends. When it has been determined that the "accepted" value has been decrypted (Yes in Step S51), the client 20 determines that the automaton possessed by the server 30 has transitioned to the proper final state on the basis of the inputted string (accepted), and the flow ends.

As mentioned above, the checking system 10 in the present embodiment is able to check whether or not a string has been accepted by an automaton without disclosing to the server 30 the string inputted to the client 20, and without disclosing to the client 20 the automaton possessed by the server 30. Thus, in the checking system 10 of the present embodiment, only specific information is passed from the server 30 to the client 20, and information inputted to the client 20 (such as a password or personal information) is not disclosed to the server 30.

Figure 11:
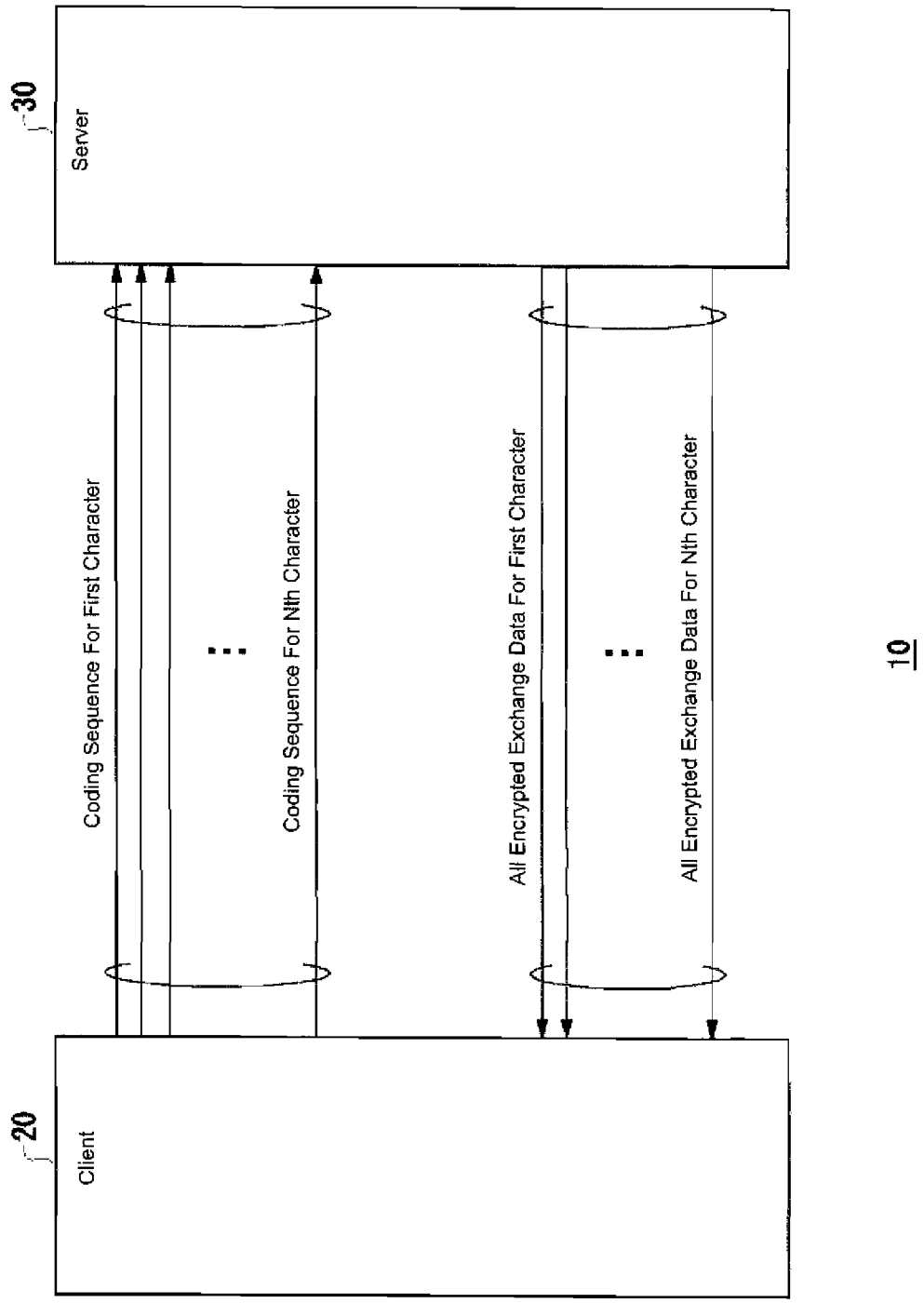
FIG. 11 shows an example of data transition in which coding sequences corresponding to a plurality of characters are arranged side by side, and sent from the client 20 to the server 30.

FIG. 11 shows an example of data transition in which coding sequences corresponding to a plurality of characters are arranged side by side, and sent from the client 20 to the server 30. The client 20 and the server 30 may perform the sending process and the receiving process on more than one character at a time.

In other words, the client 20 collects and sends to the server 30 in parallel a plurality of coding sequences (for example, N coding sequences) corresponding to a plurality of characters (for example, N characters) included in the inputted string. The server 30 then generates encrypted exchange data corresponding to a plurality of characters (N characters) in response to receiving a plurality of coding sequences (for example, N coding sequences). The server 30 then sends the encrypted exchange data for the plurality of characters in parallel to the client 20.

Then, the client 20 decodes in successive order, from the encrypted exchange data for the first character, the encrypted exchange data for the plurality of characters. In this way, the client 20 and the server 30 can execute the sending process and the receiving process all at once.

Figure 12:
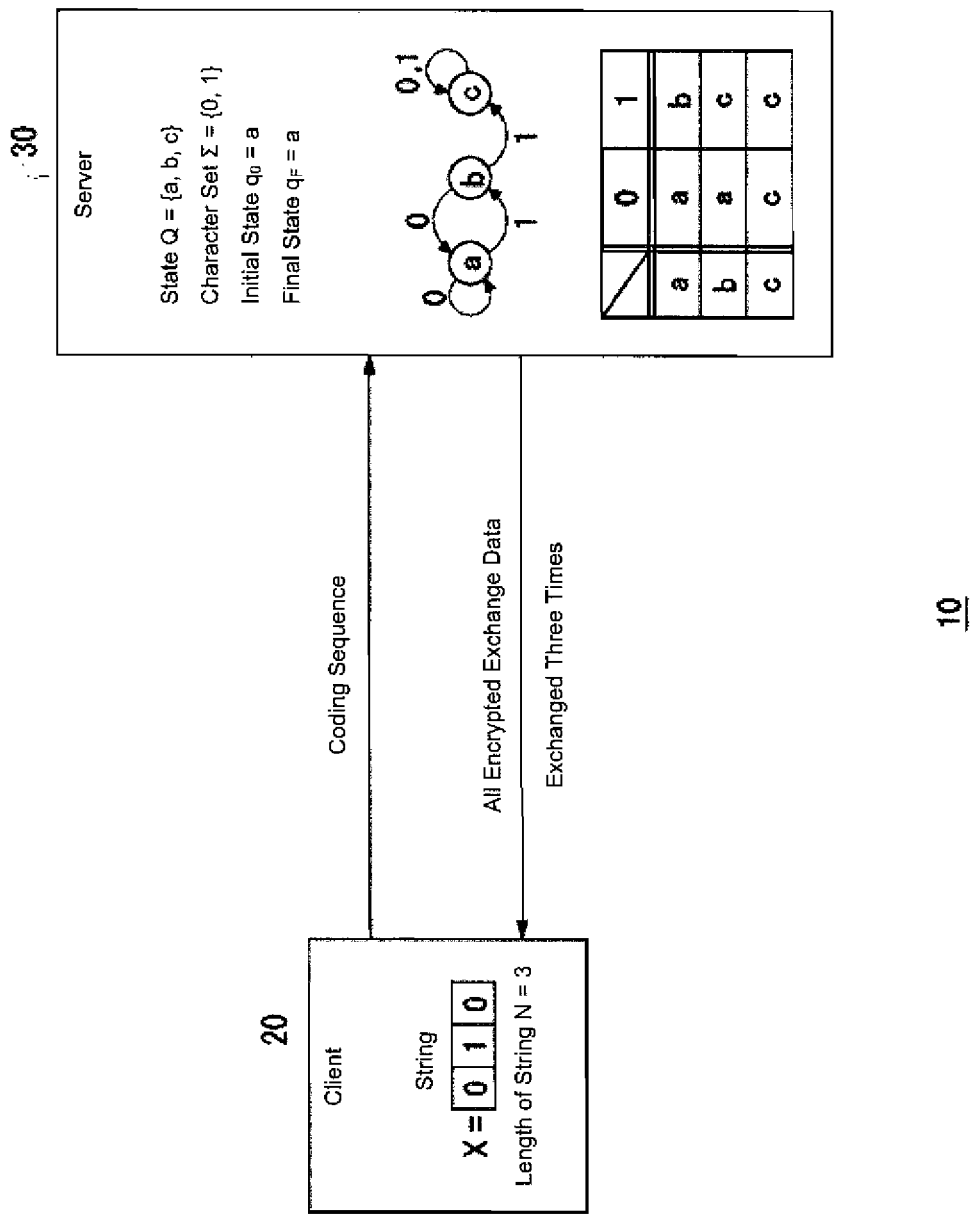
FIG. 12 shows an example of a string inputted to the client 20, and an example of an automaton possessed by the server 30.

FIG. 12 shows an example of a string inputted to the client 20, and an example of an automaton possessed by the server 30. The following is an explanation of the operations performed by the client 20 and the server 30 using this specific example.

In this example, the client 20 inputs string "010" with a length (N) of "3". Also, the automaton possessed by server 30 has three states ("a", "b" and "c"), and inputs characters "0" and "1". The automaton also has an initial state $Q_0$ of "1", and a proper final state of "a".

In this example, the automaton transitions to state "a" when character "0" is inputted in state "a", and transitions to state "b" when character "1" is inputted in state "a". Also, the automaton transitions to state "a" when character "0" is inputted in state "b", and transitions to state "c" when character "1" is inputted in state "b". Also, the automaton transitions to state "c" when character "0" is inputted to state "c", and transitions to state "c" when character "1" is inputted to state "c".

Figure 13:
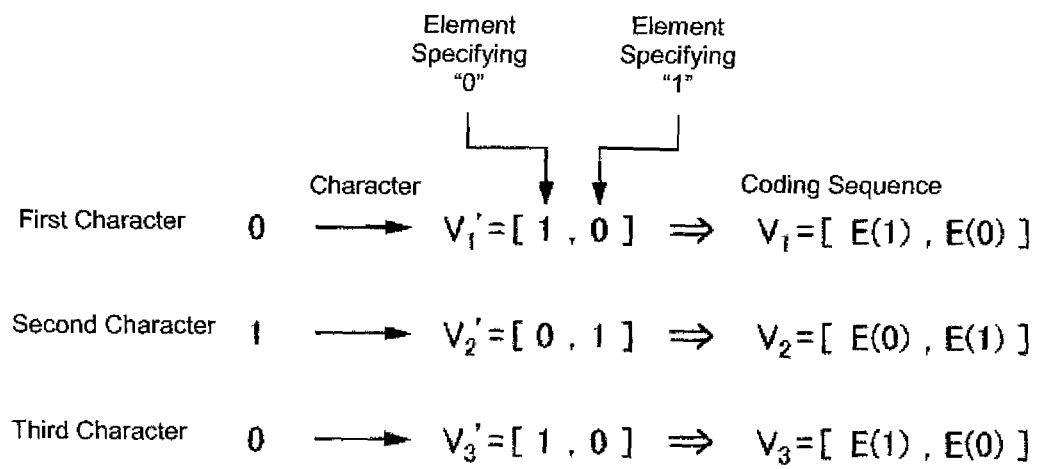
FIG. 13 shows an example of the coding sequence when string "010" has been inputted.

FIG. 13 shows an example of the coding sequence when string "010" has been inputted. In response to the first character "0", the client 20 generates a sequence $V_1'$ in which predetermined non-unity value "1" is placed in the first element, and unity value "0" is placed in the second element. Next, the client 20 encrypts the two elements in sequence $V_1'$ using an expansion ElGamal encryption scheme to generate coding sequence ($V_1 = [E(1), E(0)]$).

In response to the second character "1", the client 20 generates a sequence $V_2'$ in which unity value "0" is placed in the first element, and predetermined non-unity value "1" is placed in the second element. Next, the client 20 encrypts the two elements in sequence $V_2'$ using an expansion ElGamal encryption scheme to generate coding sequence ($V_2 = [E(0), E(1)]$).

In response to the third character "0", the client 20 generates a sequence $V_3'$ in which predetermined non-unity value "1" is placed in the first element, and unity value "0" is placed in the second element. Next, the client 20 encrypts the two elements in sequence $V_3'$ using an expansion ElGamal encryption scheme to generate coding sequence ($V_3 = [E(1), E(0)]$).

Figure 14:
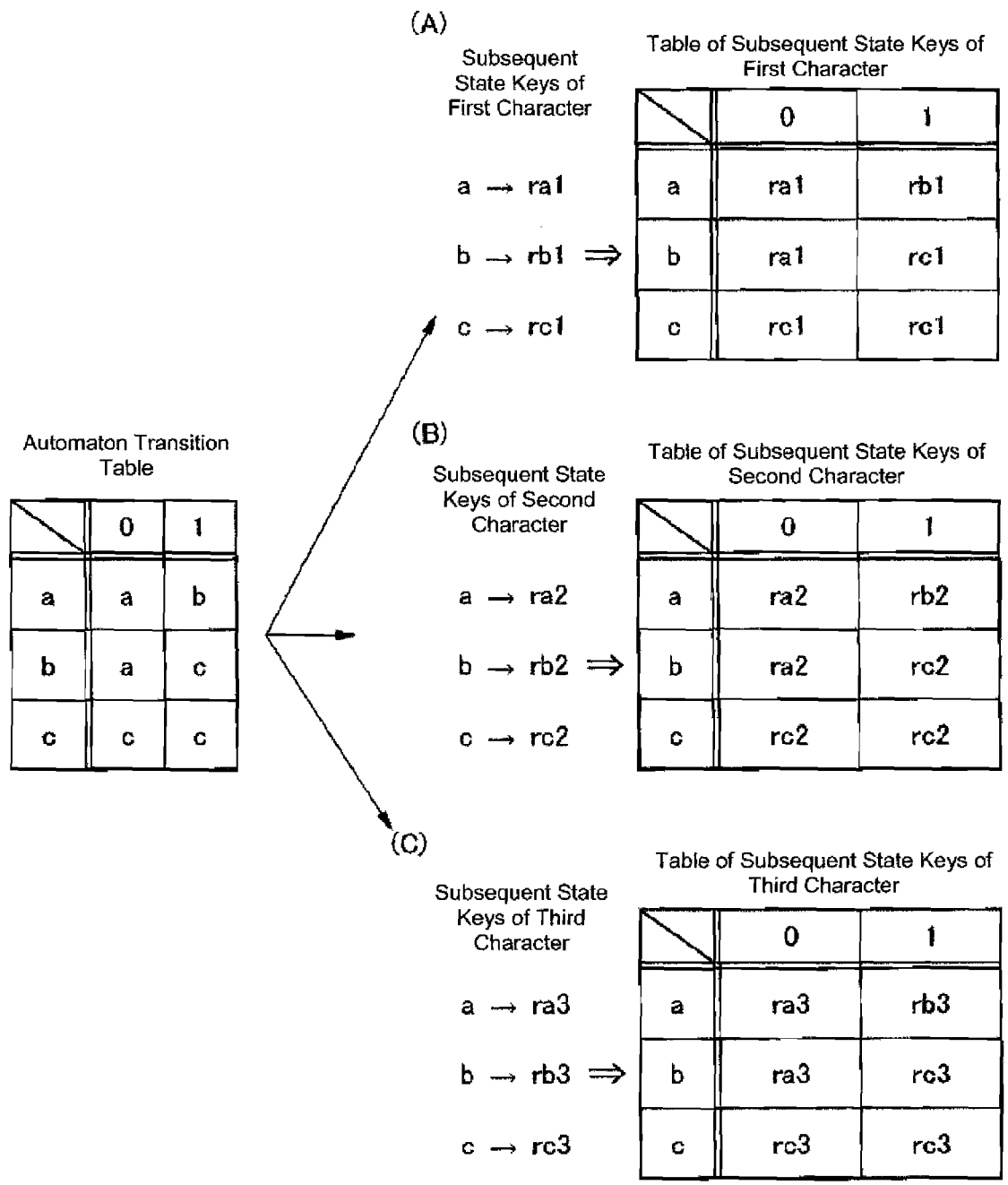
FIG. 14 shows an example of a transition table for an automaton, and a table of subsequent state keys corresponding to the first character, the second character, and the third character.

FIG. 14 shows an example of a transition table for an automaton, and a table of subsequent state keys corresponding to the first character, the second character, and the third character. As the subsequent state keys for the first character, as shown in FIG. 14 (A), the server 30 generates subsequent state key $r_{a1}$ corresponding to state "a", subsequent state key $r_{b1}$ corresponding to state "b", and subsequent state key rd corresponding to state "c". As a result, the key table of the subsequent state keys for the first character as assigned to the transition table of the automaton includes $r_{a1}$ for character "0" in state "a", $r_{b1}$ for character "1" in state "a", $r_{a1}$ for character "0" in state "b", $r_{c1}$ for character "1" in state "b", $r_{c1}$ for character "0" in state "c", and $r_{c1}$ for character "1" in state "c".

As the subsequent state keys for the second character, as shown in FIG. 14 (B), the server 30 generates subsequent state key $r_{a2}$ corresponding to state "a", subsequent state key $r_{b2}$ corresponding to state "b", and subsequent state key $r_{c2}$ corresponding to state "c". As a result, the key table of the subsequent state keys for the second character as assigned to the transition table of the automaton includes $r_{a2}$ for character "0" in state "a", $r_{b2}$ for character "1" in state "a", $r_{a2}$ for character "0" in state "b", $r_{c2}$ for character "1" in state "b", $r_{c2}$ for character "0" in state "c", and $r_{c2}$ for character "1" in state "c".

As the subsequent state keys for the third character, as shown in FIG. 14 (C), the server 30 generates subsequent state key $r_{a3}$ corresponding to state "a", subsequent state key $r_{b3}$ corresponding to state "b", and subsequent state key $r_{c3}$ corresponding to state "c". As a result, the key table for acceptance or non-acceptance of the third character as assigned to the transition table of the automaton includes $r_{a3}$ for character "0" in state "a", $r_{b3}$ for character "1" in state "a", $r_{a3}$ for character "0" in state "b", $r_{c3}$ for character "1" in state "b", $r_{c3}$ for character "0" in state "c", and $r_{c3}$ for character "1" in state "c".

Figure 15:
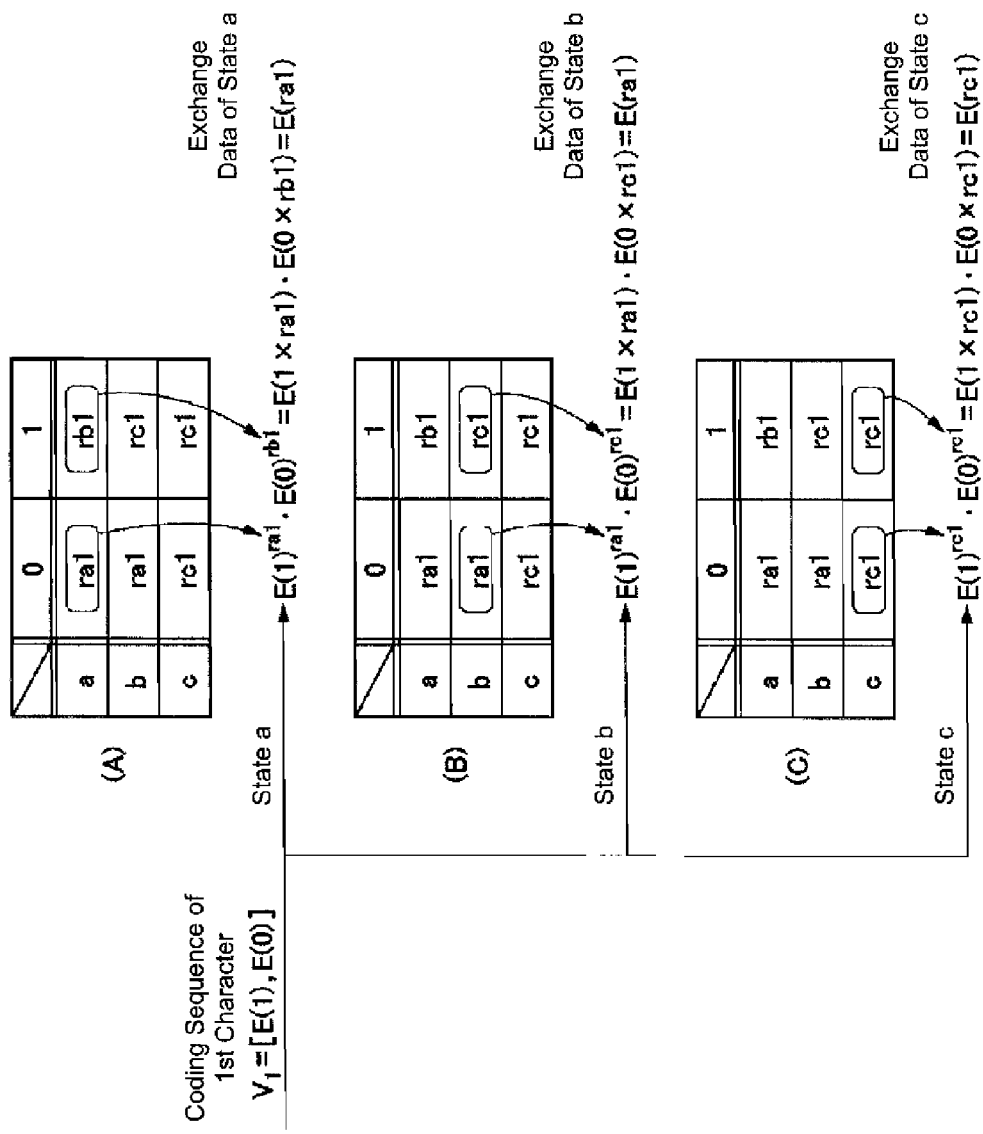
FIG. 15 shows a processing example in which exchange data is generated for each previous state from the coding sequence of the first character.

FIG. 15 shows a processing example in which exchange data is generated for each previous state from the coding sequence of the first character. The server 30 executes the following processing when exchange data is generated for each previous state from the coding sequence for the first character.

When, as shown in FIG. 15 (A), exchange data is generated for state "a" of the first character, the server 30 raises the first element E(1) of the coding sequence $V_1$ of the first character to the power of subsequent state key "$r_{a1}$" assigned to state "a" and character "0" in the key table for the first character. Also, the server 30 raises the second element E(0) of the coding sequence $V_1$ of the first character to the power of subsequent state key "$r_{b1}$" assigned to state "a" and character "1" in the key table for the first character. Next, the server 30 synthesizes the elements raised to the power of the subsequent state key using an addition operation. In this way, the server 30 can generate exchange data corresponding to previous state "a" in which the subsequent state key $r_{a1}$ is encrypted using an expansion ElGamal encryption scheme based on the nature of an encryption scheme having additive homomorphism.

When, as shown in FIG. 15 (B), exchange data is generated for state "b" of the first character, the server 30 raises the first element E(1) of the coding sequence $V_1$ of the first character to the power of subsequent state key "$r_{a1}$". Also, the server 30 raises the second element E(0) of the coding sequence $V_1$ of the first character to the power of subsequent state key "$r_{c1}$". Next, the server 30 performs an addition operation to synthesize these. In this way, the server 30 can generate exchange data corresponding to previous state "b" in which previous state key $r_{a1}$ has been encrypted using an expansion ElGamal encryption scheme.

When, as shown in FIG. 15 (C), exchange data is generated for state "c" of the first character, the server 30 raises the first element E(1) of the coding sequence $V_1$ of the first character to the power of subsequent state key "$r_{c1}$". Also, the server 30 raises the second element E(0) of the coding sequence $V_1$ of the first character to the power of subsequent state key "$r_{c1}$". Next, the server 30 performs an addition operation to synthesize these. In this way, the server 30 can generate exchange data corresponding to previous state "c" in which previous state key $r_{c1}$ has been encrypted using an expansion ElGamal encryption scheme.

In the exchange data for the first character, the server 30 can generate only exchange data for initial state "a".

Figure 16:
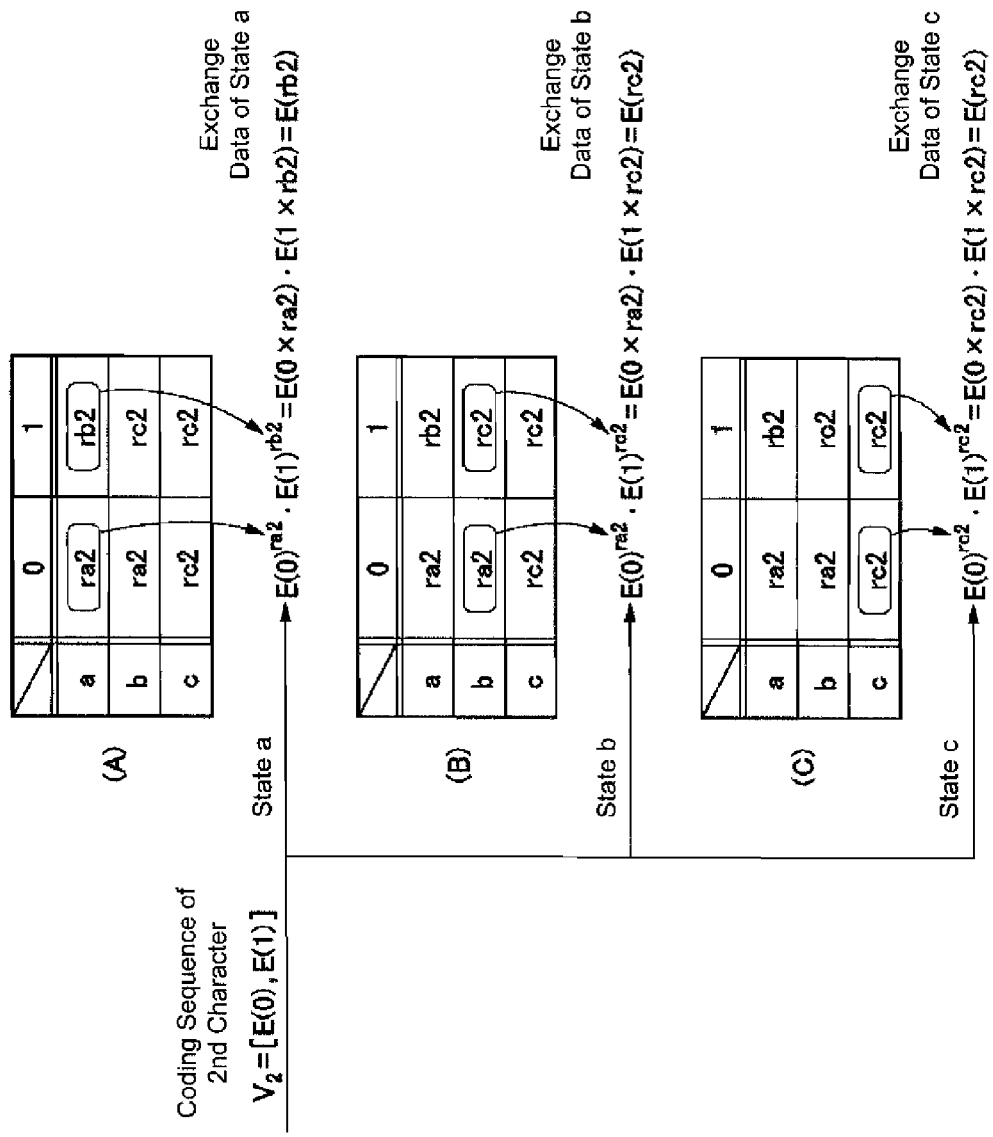
FIG. 16 shows a processing example in which exchange data is generated for each previous state from the coding sequence of the second character.

FIG. 16 shows a processing example in which exchange data is generated for each previous state from the coding sequence of the second character. The server 30 executes the following processing when exchange data is generated for each previous state from the coding sequence for the second character.

When, as shown in FIG. 16 (A), exchange data is generated for state "a" of the second character, the server 30 raises the first element E(0) of the coding sequence $V_2$ of the second character to the power of subsequent state key "$r_{a2}$". Also, the server 30 raises the second element E(1) of the coding sequence $V_2$ of the second character to the power of subsequent state key "$r_{b2}$". Next, the server 30 synthesizes the elements using an addition operation. In this way, the server 30 can generate exchange data corresponding to previous state "a" in which the subsequent state key $r_{b2}$ is encrypted using an expansion ElGamal encryption scheme.

When, as shown in FIG. 16 (B), exchange data is generated for state "b" of the second character, the server 30 raises the first element E(0) of the coding sequence $V_2$ of the second character to the power of subsequent state key "$r_{a2}$". Also, the server 30 raises the second element E(1) of the coding sequence $V_2$ of the second character to the power of subsequent state key "$r_{c2}$". Next, the server 30 performs an addition operation to synthesize these. In this way, the server 30 can generate exchange data corresponding to previous state "b" in which previous state key $r_{c2}$ has been encrypted using an expansion ElGamal encryption scheme.

When, as shown in FIG. 16 (C), exchange data is generated for state "c" of the second character, the server 30 raises the first element E(0) of the coding sequence $V_2$ of the second character to the power of subsequent state key "$r_{c2}$". Also, the server 30 raises the second element E(1) of the coding sequence $V_2$ of the second character to the power of subsequent state key "$r_{c2}$". Next, the server 30 performs an addition operation to synthesize these. In this way, the server 30 can generate exchange data corresponding to previous state "c" in which previous state key $r_{c2}$ has been encrypted using an expansion ElGamal encryption scheme.

Figure 17:
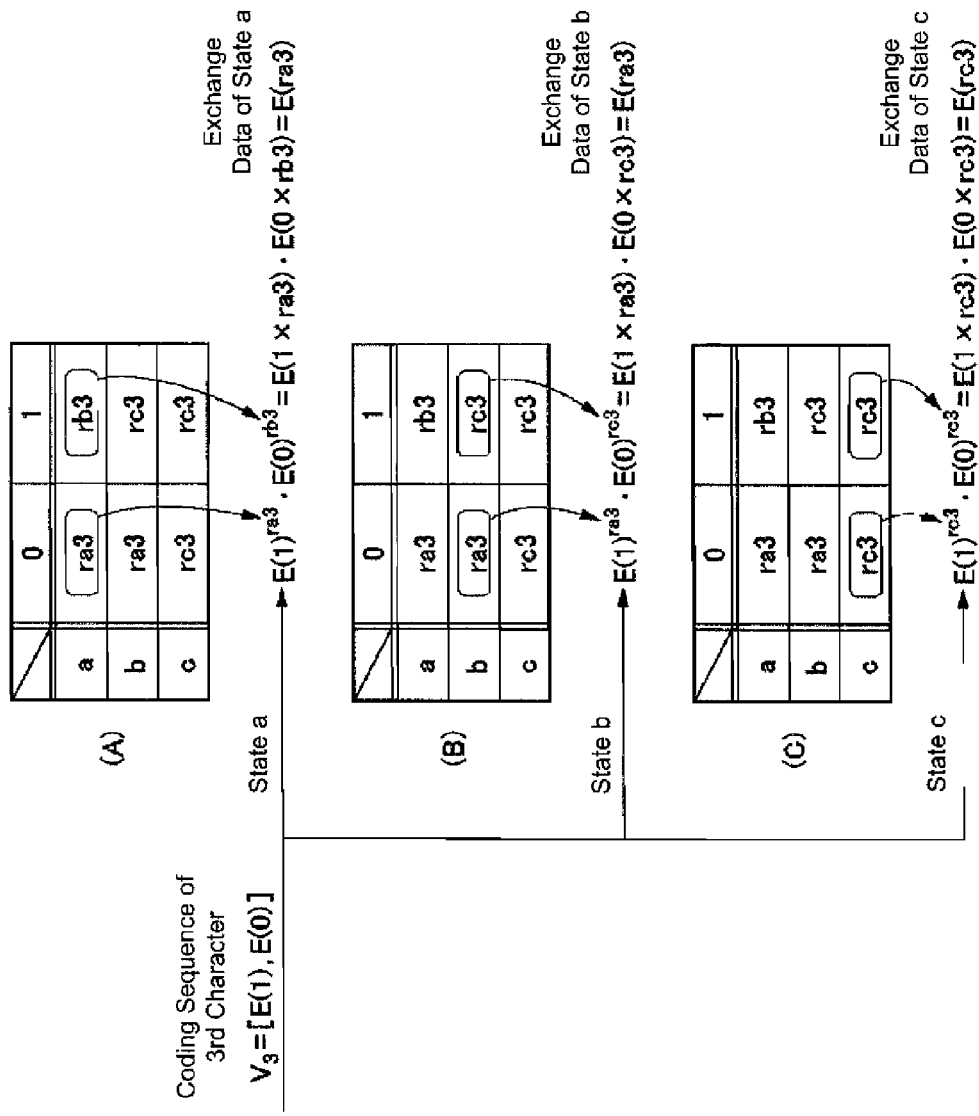
FIG. 17 shows a processing example in which exchange data is generated for each previous state from the coding sequence of the third character.

FIG. 17 shows a processing example in which exchange data is generated for each previous state from the coding sequence of the third character. The server 30 executes the following processing when exchange data is generated for each previous state from the coding sequence for the third character.

When, as shown in FIG. 17 (A), exchange data is generated for state "a" of the third character, the server 30 raises the first element E(1) of the coding sequence $V_1$ of the third character to the power of subsequent state key "$r_{a3}$". Also, the server 30 raises the second element E(0) of the coding sequence $V_1$ of the third character to the power of subsequent state key "$r_{b3}$". Next, the server 30 synthesizes the elements raised using an addition operation. In this way, the server 30 can generate exchange data corresponding to previous state "a" in which the subsequent state key "$r_{b3}$" is encrypted using an expansion ElGamal encryption scheme.

When, as shown in FIG. 17 (B), exchange data is generated for state "b" of the third character, the server 30 raises the first element E(1) of the coding sequence $V_1$ of the third character to the power of subsequent state key "$r_{a3}$". Also, the server 30 raises the second element E(0) of the coding sequence $V_1$ of the third character to the power of subsequent state key "$r_{c3}$". Next, the server 30 performs an addition operation to synthesize these. In this way, the server 30 can generate exchange data corresponding to previous state "b" in which previous state key $r_{a3}$ has been encrypted using an expansion ElGamal encryption scheme.

When, as shown in FIG. 17 (C), exchange data is generated for state "c" of the third character, the server 30 raises the first element E(1) of the coding sequence $V_1$ of the third character to the power of subsequent state key "$r_{c3}$". Also, the server 30 raises the second element E(0) of the coding sequence $V_1$ of the third character to the power of subsequent state key "$r_{c3}$". Next, the server 30 performs an addition operation to synthesize these. In this way, the server 30 can generate exchange data corresponding to previous state "c" in which previous state key "$r_{c3}$" has been encrypted using an expansion ElGamal encryption scheme.

Figure 18:
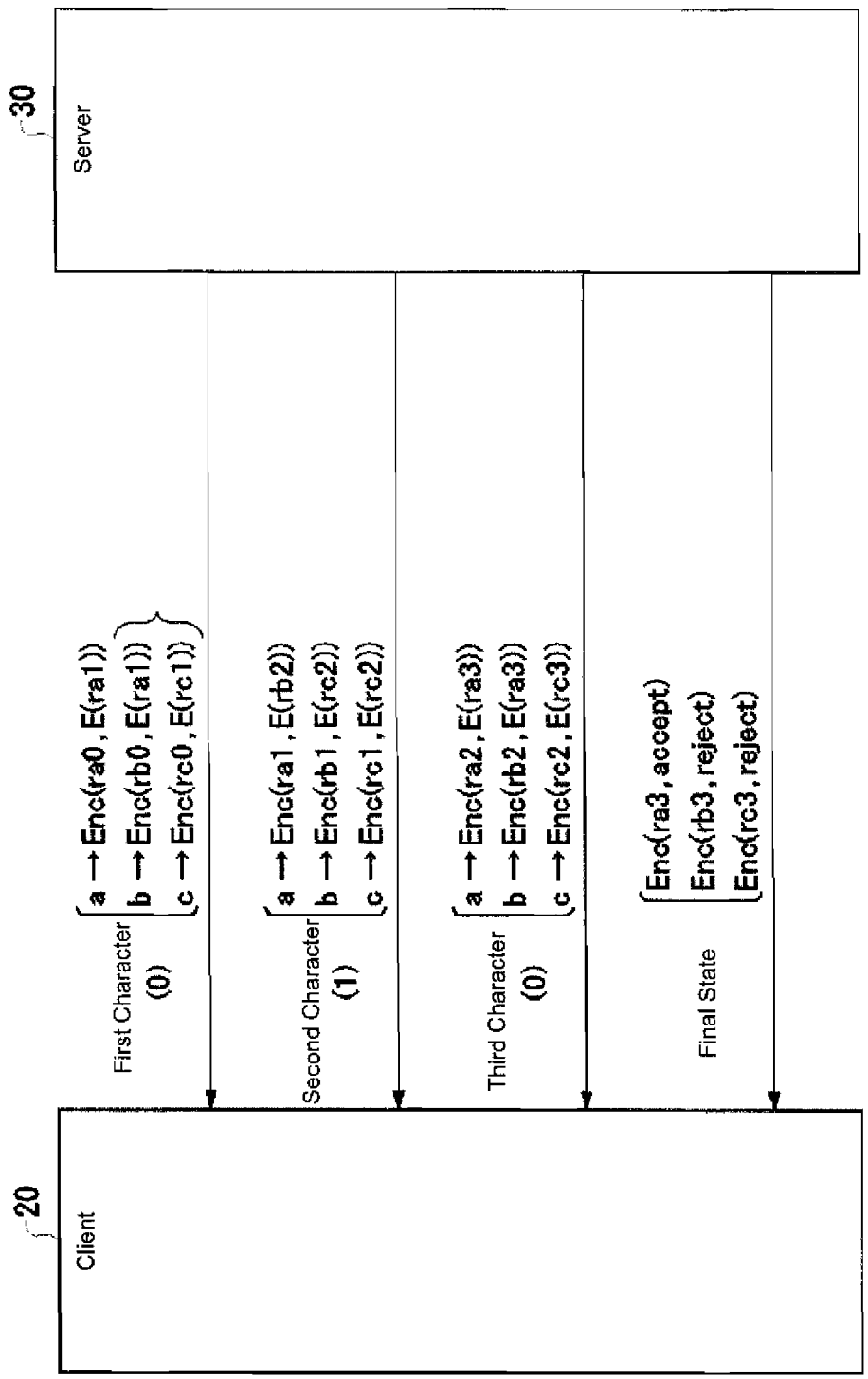
FIG. 18 shows an example of encrypted exchange data corresponding to the first through third characters and of encrypted final state data sent from the server 30 to the client 20.

FIG. 18 shows an example of encrypted exchange data corresponding to the first through third characters and of encrypted final state data sent from the server 30 to the client 20.

The server 30 generates ciphertext (Enc($r_{a0}$, E($r_{a1}$)) in which the exchange data for previous state "a" of the first character has been encrypted using previous state key "$r_{a0}$" corresponding to previous state "a" of the first character. Also, the server 30 generates ciphertext (Enc($r_{b0}$, E($r_{a1}$)) in which the exchange data for previous state "b" of the first character has been encrypted using previous state key "$r_{b0}$" corresponding to previous state "b" of the first character. Also, the server 30 generates ciphertext (Enc($r_{c0}$, E($r_{c1}$)) in which the exchange data for previous state "c" of the first character has been encrypted using previous state key "$r_{c0}$" corresponding to previous state "c" of the first character.

Then, the server 30 sends the ciphertext to the client 20. In this case, the server 30, for example, randomly sorts and sends the encrypted exchange data for each previous state to the client 20. The previous state keys $r_{a0}$, $r_{b0}$, $r_{c0}$ for the first character are generated beforehand. The server 30 may generate just exchange data corresponding to initial state "a" in the processing for the first character.

The server 30 generates ciphertext (Enc($r_{a1}$, E($r_{b2}$))) in which the exchange data for previous state "a" of the second character has been encrypted using previous state key "$r_{a1}$" corresponding to previous state "a" of the second character. Also, the server 30 generates ciphertext (Enc($r_{b1}$, E($r_{c2}$))) in which the exchange data for previous state "b" of the second character has been encrypted using previous state key "$r_{b1}$" corresponding to previous state "b" of the second character. Also, the server 30 generates ciphertext (Enc($r_{c1}$, E($r_{c2}$))) in which the exchange data for previous state "c" of the second character has been encrypted using previous state key "$r_{c1}$" corresponding to previous state "c" of the second character.

Then, the server 30 sends the ciphertext to the client 20. In this case, the server 30, for example, randomly sorts and sends the encrypted exchange data for each previous state to the client 20. The previous state keys $r_{a1}$, $r_{b1}$, $r_{c1}$ for the second character are the subsequent state keys generated for the first character.

The server 30 generates ciphertext (Enc($r_{a2}$, E($r_{a3}$))) in which the exchange data for previous state "a" of the third character has been encrypted using previous state key "$r_{a2}$" corresponding to previous state "a" of the third character. Also, the server 30 generates ciphertext (Enc($r_{b2}$, E($r_{a3}$))) in which the exchange data for previous state "b" of the third character has been encrypted using previous state key "$r_{b2}$" corresponding to previous state "b" of the third character. Also, the server 30 generates ciphertext (Enc($r_{c2}$, E($r_{c3}$))) in which the exchange data for previous state "c" of the third character has been encrypted using previous state key "$r_{c2}$" corresponding to previous state "c" of the third character.

Then, the server 30 sends the ciphertext to the client 20. In this case, the server 30, for example, randomly sorts and sends the encrypted exchange data for each previous state to the client 20. The previous state keys $r_{a2}$, $r_{b2}$, $r_{c2}$ for the third character are the subsequent state keys generated by the server 30 for the second character.

Also, the server 30 generates ciphertext (Enc($r_{a3}$, accept)) in which the value indicating that state "a" is the proper final state (accept) has been encrypted using the subsequent state key "$r_{a3}$" of the third character corresponding to state "a". Also, the server 30 generates ciphertext (Enc($r_{b3}$, reject)) in which the value indicating that state "b" is not the proper final state (reject) has been encrypted using the subsequent state key "$r_{b3}$" corresponding to state "b". Also, the server 30 generates ciphertext (Enc($r_{c3}$, reject)) in which the value indicating that state "c" is not the proper final state (reject) has been encrypted using the subsequent state key "$r_{c3}$" of the third character corresponding to state "c".

Then, the server 30 sends the ciphertext to the client 20. In this case, the server 30, for example, randomly sorts and sends the encrypted final state data for each previous state to the client 20.

Figure 19:
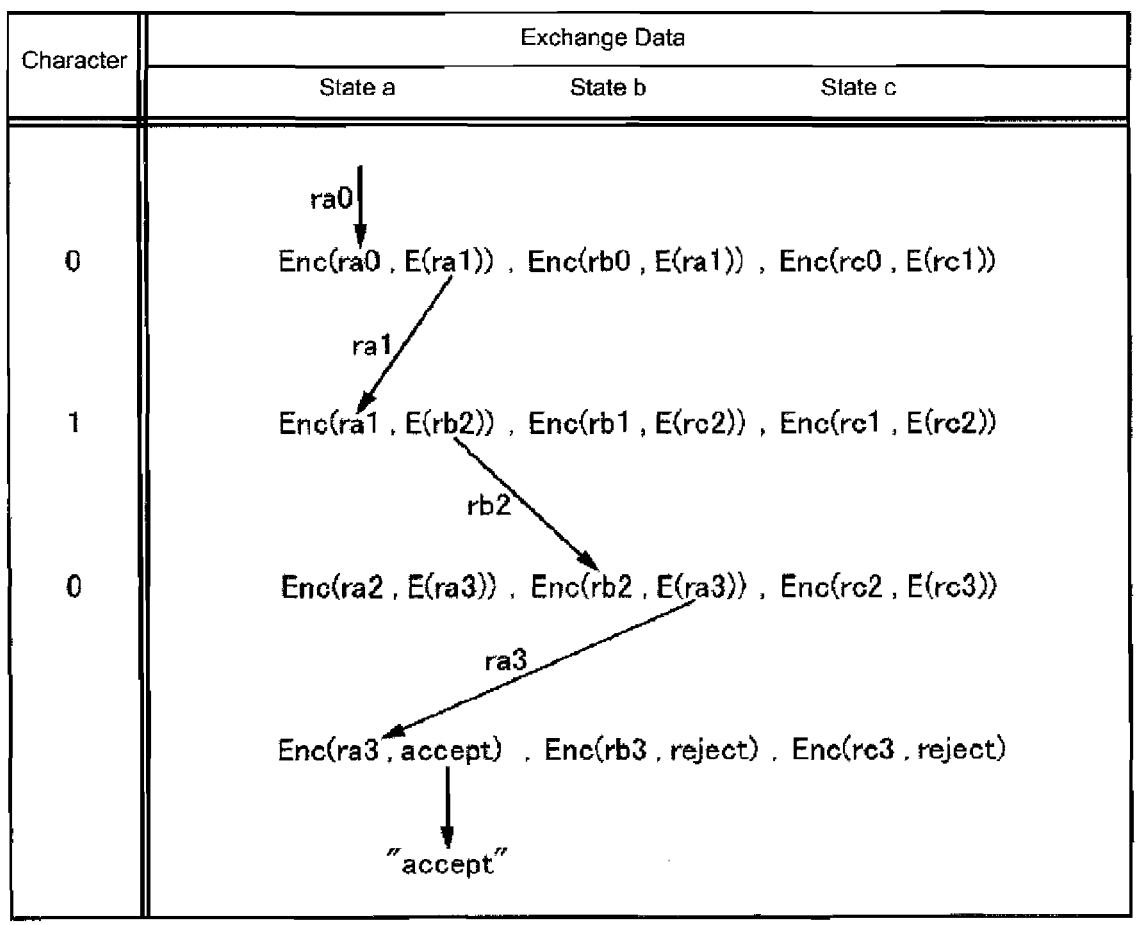
FIG. 19 shows an example of an order for the decryption process executed by the client 20.

FIG. 19 shows an example of an order for the decryption process executed by the client 20.

First, the client 20 decrypts the exchange data encrypted corresponding to the first character using the previous state key corresponding to the first character. The client 20 receives in advance from the server 30 the previous state key $r_{a0}$ corresponding to initial state "a" as the previous state key corresponding to the first character. Thus, the client 20 can decrypt the exchange data (E($r_{a1}$)) corresponding to state "a" by performing the decryption process on the encrypted exchange data corresponding to the first character. The client 20 decrypts on a single set of exchange data when the server 30 sends only the encrypted exchange data corresponding to the initial state.

Next, the client 20 decrypts the decrypted exchange data (E($r_{a1}$)) using the key corresponding to the encryption key used to generate the coding sequence for the first character. In this way, the client 20 can decrypt subsequent state key "$r_{a1}$" corresponding to subsequent state "a" transitioned to when character "0" is inputted in initial state "a".

Next, the client 20 decrypts the encrypted exchange data corresponding to the second character using the previous state key corresponding to the second character. The previous state key corresponding to the second character is subsequent state key "$r_{a1}$" decrypted from the exchange data for the first character. Thus, the client 20 can decrypt exchange data (E($r_{b2}$)) corresponding to state "a" by decrypting the encrypted exchange data corresponding to the second character.

Next, the client 20 decrypts the decrypted exchange data (E($r_{b2}$)) using the key corresponding to the encryption key used to generate the coding sequence for the second character. In this way, the client 20 can decrypt subsequent state key "$r_{b2}$" for the second character corresponding to subsequent state "b" transitioned to when character "1" is inputted in previous state "a".

Next, the client 20 decrypts the encrypted exchange data corresponding to the third character using the previous state key corresponding to the third character. The previous state key corresponding to the third character is subsequent state key "$r_{b2}$" decrypted from the exchange data for the second character. Thus, the client 20 can decrypt exchange data (E($r_{a3}$)) corresponding to state "b" by decrypting the encrypted exchange data corresponding to the third character.

Next, the client 20 decrypts the decrypted exchange data (E($r_{a3}$)) using the encryption key used to generate the coding sequence for the third character. In this way, the client 20 can decrypt subsequent state key "$r_{a3}$" for the third character corresponding to subsequent state "a" transitioned to when character "0" is inputted in state "b".

Next, the client 20 decrypts the encrypted final state data among the plurality of states using the decrypted subsequent state key "$r_{c3}$" corresponding to the third character. In this way, the client 20 can decrypt the "accepted" value from the final state data corresponding to state "a".

By executing the processing described above, the client 20 and the server 30 can check whether a string has been accepted by an automaton without the string inputted to the client 20 being disclosed to the server 30 and without the automaton possessed by the server 30 being disclosed to the client 20.

Figure 20:
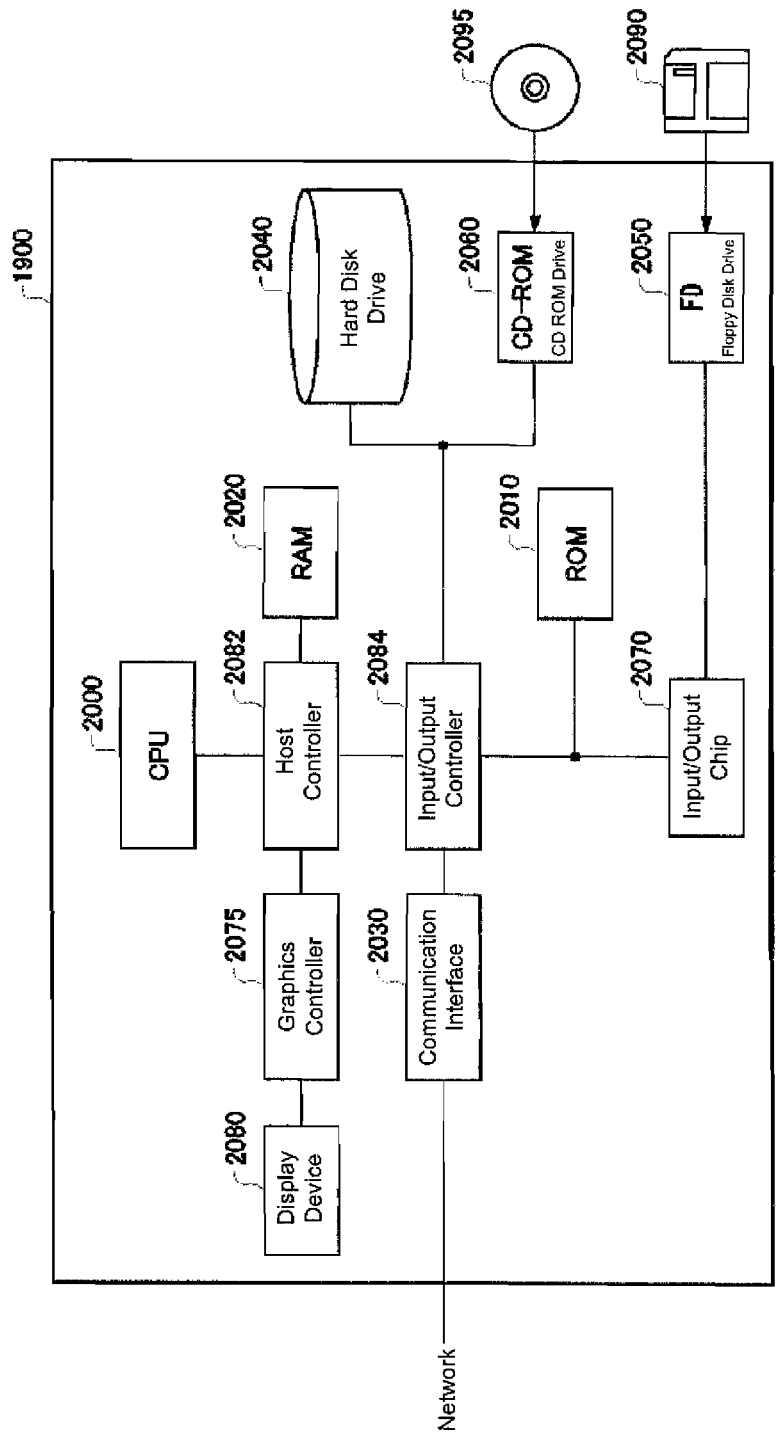
FIG. 20 shows an example of the hardware configuration of the computer 1900 in the present embodiment.

FIG. 20 shows an example of the hardware configuration of the computer 1900 in the present embodiment. The computer 1900 in the present embodiment is equipped with a CPU peripheral portion having a CPU 2000, RAM 2020, graphics controller 2075 and display 2080 connected to each other by a host controller 2082, an input/output portion having a communication interface 2030, a hard disk drive 2040 and a CD-ROM drive 2060 connected to the host controller 2082 by an input/output controller 2084, and a legacy input/output portion having a ROM 2010, floppy disk drive 2050, and input/output chip 2070 connected to the input/output controller 2084.

The host controller 2082 is connected to RAM 2020, a CPU 2000 accessing the RAM 2020 at a high transfer rate, and a graphics controller 2075. The CPU 2000 is operated on the basis of a program stored in the ROM 2010 and the RAM 2020, and controls the various units. The graphics controller 2075 acquires the image data generated in the frame buffer of the RAM 2020 by the CPU 2000 and other units, and displays this image data on the display device 2080. Alternatively, the graphics controller 2075 can include a frame buffer for storing image data generated by the CPU 2000 and other units.

The input/output controller 2084 is connected to a host controller 2082, a communication interface 2030 serving as a relatively high-speed input/output device, a hard disk drive 2040, and a CD-ROM drive 2060. The communication interface 2030 communicates with the other devices via a network. The hard disk drive 2040 stores the programs and data used by the CPU 2000 in the computer 1900. The CD-ROM drive 2060 reads programs and data from the CD-ROM 2095 and provides them to the hard disk drive 2040 via the RAM 2020.

The input/output controller 2084 is connected to the ROM 2010, the floppy disk drive 2050, and the relatively low-speed input/output device of the input/output chip 2070. The ROM 2010 stores the boot program executed by the computer 1900 at startup and/or programs relying on hardware in the computer 1900. The floppy disk drive 2050 reads programs or data from a floppy disk drive 2090, and provides the programs and data to the hard disk drive 2040 via the RAM 2020. The input/output chip 2070 connects the floppy disk drive 2050 to the input/output controller 2084. Various types of input/output device are connected to the input/output controller 2084 via a parallel port, serial port, keyboard port, mouse port, etc.

A program provided to the hard disk drive 2040 via the RAM 2020 is stored on a recording medium such as a floppy disk 2090, CD-ROM 2095 or IC card, and provided by the user. A program is read from the recording medium, installed in the hard disk drive 2040 inside the computer 1900 via the RAM 2020, and executed by the CPU 2000.

A program installed in a computer 1900 to enable the computer 1900 to function as a client 20 includes a character input module, a sequencing module, a first encryption module, a client-side transmitting module, a client-side receiving module, a client-side key storage module, a second decrypting module, a first decrypting module, and a determining module. These programs or modules are activated by the CPU 2000 etc. to enable the computer 1900 to function as a character input unit 32 a sequencing unit 34, a first encryption unit 36, a client-side transmitting unit 38, a client-side receiving unit 40, a client-side key storage unit 42, a second decryption unit 44, a first decryption unit 46, and a determining unit 48.

The information processing written in these programs are specific means activated by reading the programs to the computer 1900 so that the software cooperates with the various types of hardware resources described above. This information processing functions as a character input unit 32 a sequencing unit 34, a first encryption unit 36, a client-side transmitting unit 38, a client-side receiving unit 40, a client-side key storage unit 42, a second decryption unit 44, a first decryption unit 46, and a determining unit 48. These specific means realize operations and the processing of information in accordance with the intended purpose of the computer 1900 in the present embodiment to construct a dedicated client 20 for this intended purpose.

A program installed in a computer 1900 to enable the computer 1900 to function as a server 30 includes a server-side receiving module, an automaton storage module, a key generating module, a server-side key storage module, an exchange data generating module, a second encryption module, and a server-side transmitting module. These programs or modules are activated by the CPU 2000 etc. to enable the computer 1900 to function as a server-side receiving unit 52, an automaton storage unit 54, a key generating unit 56, a server-side key storage unit 58, an exchange data generating unit 60, a second encryption unit 62, and a server-side transmitting unit 64.

The information processing written in these programs are specific means activated by reading the programs to the computer 1900 so that the software cooperates with the various types of hardware resources described above. This information processing functions as a server-side receiving unit 52, an automaton storage unit 54, a key generating unit 56, a server-side key storage unit 58, an exchange data generating unit 60, a second encryption unit 62, and a server-side transmitting unit 64. These specific means realize operations and the processing of information in accordance with the intended purpose of the computer 1900 in the present embodiment to construct a dedicated server 30 for this intended purpose.

For example, when the computer 1900 communicates with an external device, the CPU 2000 executes the communication program loaded in the RAM 2020, and instructs the communication interface 2030 in the communication processing on the basis of the processing content written in the communication program. The communication interface 2030 is controlled by the CPU 2000, and reads the transmitted data stored in the transmission buffer region of a memory device such as the RAM 2020, hard disk drive 2040, floppy disk 2090 or CD-ROM 2095, or writes reception data received from the network to a reception buffer region of the storage device. In this way, the communication interface 2030 transfers transmitted and received data to the storage device using the direct memory access (DMA) method. Alternatively, the CPU 2000 transfers transmitted and received data by reading data from the source storage device or communication interface 2030, and writing data to the destination communication interface 2030 or storage device.

Also, the CPU 2000 writes all of the data or the necessary data to the RAM 2020 via, for example, a DMA transfer, from files or databases stored in an external storage device such as a hard disk drive 2040, a CD-ROM drive 2060 (CD-ROM 2095) or a floppy disk drive 2050 (floppy disk 2090), and performs various types of processing on the data in the RAM 2020. The CPU 2000 then writes the processed data to the external storage device via, for example, a DMA transfer. Because the RAM 2020 temporarily stores the contents of the external storage device during this process, the RAM 2020 and the external storage device are generally referred to in the present embodiment as memory, a storage unit, or a storage device. The various types of information in the various types of programs, data, tables and databases of the present embodiment are stored in these memory devices, and are the targets of information processing. The CPU 2000 can hold some of the RAM 2020 in cache memory, and read and write data to the cache memory. Here, the cache memory performs some of the functions of the RAM 2020. Therefore, this division is excluded in the present embodiment. Cache memory is included in the RAM 2020, the memory, and/or the storage device.

The CPU 2000 also performs various types of processing on data read from the RAM 2020 including the operations, processing, condition determination, and information retrieval and replacement described in the present embodiment and indicated by a sequence of instructions in the program, and writes the results to the RAM 2020. For example, when performing a condition determination, the CPU 2000 compares various types of variables described in the present embodiment to other variables or constants to determine whether or not conditions such as large, small, greater than, less than or equal have been satisfied. When a condition has been satisfied (or not satisfied), the process branches to a different sequence of instructions or calls up a subroutine.

The CPU 2000 can also retrieve information stored in files or databases inside the memory device. For example, when a plurality of entries associating an attribute value for a second attribute to an attribute value for a first attribute, the CPU 2000 can retrieve an entry matching the conditions indicated by the attribute value of the first attribute among the plurality of entries stored in the storage device, and then obtain the attribute value of the second value associated with the first value satisfying a predetermined condition by reading the attribute value of the second attribute stored in the entry.

A program or module described above can be stored in a recording medium of an external unit. Instead of a floppy disk 2090 or a CD-ROM 2095, the recording medium can be an optical recording medium such as a DVD or CD, a magneto-optical recording medium such as MO, a tape medium, or a semiconductor memory such as an IC card. The recording medium can also be a storage device such as a hard disk or RAM provided in a server system connected to a dedicated communication network or the internet, and the program can be provided to the computer 1900 via the network.

The present invention was explained using an embodiment, but the technical scope of the present invention is not limited to the embodiment described above. The possibility of many changes and improvements to this embodiment should be apparent to those skilled in the art. Embodiments including these changes and improvements are within the technical scope of the present invention, as should be clear from the description of the claims.

The order of execution for operations, steps and processes in the devices, systems, programs and methods described in the claims, description and drawings were described using such terms as "previous" and "prior". However, these operations, steps and processes can be realized in any order as long as the output of the previous process is used by the subsequent process. The operational flow in the claims, description and drawing were explained using terms such as "first" and "next" for the sake of convenience. However, the operational flow does not necessarily have to be executed in this order.

The invention claimed is:

1. A server connectable to a client for input of a string, having an automaton whose state transitions in accordance with received characters, and determining whether the automaton has transitioned to a final state based on characters of the string, the server comprising:
   a receiver for receiving from the client a coding sequence in characters included in the string, the coding sequence comprising elements corresponding to the characters that are values encrypting a non-unity using a first encryption scheme having homomorphism, and whose elements not corresponding to the characters are values encrypting a unity using a first encrypting scheme;
   a processing device for performing steps of:
   generating, in response to receiving the coding sequence, exchange data encrypting a subsequent state key corresponding to each of a plurality of previous states of the automaton based on the coding sequence using the first encryption scheme;
   encrypting exchange data with a corresponding previous state key; and
   sending the encrypted exchange data to the client.

2. The server of claim 1, wherein the client receives from the server encrypted exchange data corresponding to each of a plurality of previous states of the automaton;
   encrypts each of the plurality of exchange data sets using a state key previously stored by the client for a previous state and the first encryption scheme; and
   stores a single decrypted subsequent state key as a previous state key for decrypting exchange data received from the server for a next character.

3. The server according to claim 2, wherein the first encryption scheme is a method having different ciphertext in each encryption process, even when same plain text is encrypted.

4. The server according to claim 3, wherein the first encryption scheme is an encryption scheme having additive homomorphism.

5. The server according to claim 4, wherein the first encryption scheme is an expansion ElGamal system.

6. The server according to claim 3, wherein the first encryption scheme is an encryption system having a multiplicative homomorphism.

7. The server according to claim 3, wherein the subsequent state key is a random number associated with a plurality of subsequent states in the automaton.

8. The server of claim 7, wherein
   the processing device further performs steps of generating exchange data encrypting a subsequent state key using the first encryption scheme by raising each element in the received coding sequence in accordance with the plurality of previous states of the automaton to a power of the subsequent state key corresponding to a subsequent state transitioned to from a previous state based on an inputted character specified by the element, and by combining a plurality of elements raised to a power of the subsequent state key using an operation in accordance with the first encryption scheme.

9. The server of claim 8, wherein the processing device further performs steps of
   generating subsequent state keys corresponding to each character in the string and to each of a plurality of subsequent states of the automaton;
   storing at a server-side key storage unit the subsequent state keys associated with each of the plurality of subsequent states as a plurality of previous state keys corresponding to each of a plurality of previous states when a next character is inputted; and
   encrypting the exchange data generated in accordance with the plurality of subsequent states of the automaton using a corresponding previous state key.

10. The server of claim 8, wherein the client further comprises a client-side key storage unit for storing the decrypted subsequent state key as the previous state key for decrypting the plurality of data states received from the server corresponding to a next character.

11. The server of claim 8, wherein generating the exchange data raises each element in the coding sequence to a power of a value meaning "accepted" instead of the previous state key when the state after transition from the previous state is a proper final state of the automaton; and wherein the client determines whether the automaton has transitioned to the proper final state on the basis of the string when the value meaning "accepted" has been decrypted from the exchange data.

12. The server of claim 1, wherein the client sends in parallel to the server a plurality of coding sequences corresponding to each of the plurality of characters included in the string.

13. The server of claim 12, wherein the server sends in parallel to the client exchange data corresponding to each of the plurality of previous states of the automaton for each of the plurality of characters; and wherein the client decrypts the exchange data for each of the plurality of characters in successive order beginning with the exchange data corresponding to the first character.

14. The server of claim 1, wherein the server, in response to receiving a coding sequence, sorts and sends for each coding sequence exchange data encrypted in accordance with each of the plurality of previous states of the automaton.

15. A client connectable to a server having an automaton whose state transitions in accordance with received characters, receiving input of a string, and determining whether the automaton has transitioned to a final state on based on the string, the client comprising:
  a processing device for performing steps of:
    sending to a server, in characters included in a string, a coding sequence whose elements corresponding to characters are values encrypting a non-unity using a first encryption scheme having homomorphism, and whose elements not corresponding to the characters are values encrypting a unity using a first encrypting scheme; and
    receiving from the server ciphertext encrypting exchange data using a corresponding previous state key, the exchange data generated, in response to receiving the coding sequence, to encrypt a subsequent state key corresponding to each of a plurality of previous states of the automaton based on the coding sequence using the first encryption scheme.

16. An information processing method for a server connectable to a client for input of a string, having an automaton whose state transitions in accordance with received characters, the server determining whether the automaton has transitioned to a final state based on string, the method comprising:
  receiving from the client, in characters included in the string, a coding sequence whose elements corresponding to the characters are values encrypting a non-unity using a first encryption scheme having homomorphism, and whose elements not corresponding to the characters are values encrypting a unity using the first encrypting scheme;
  generating, in response to receiving the coding sequence, exchange data encrypting a subsequent state key corresponding to each of a plurality of previous states of the automaton on the basis of the coding sequence using the first encryption scheme;
  encrypting the exchange data with the corresponding previous state key; and
  sending the encrypted exchange data to the client.

17. A non-transitory program storage medium storing a program of instructions for causing the computer to execute the instructions to perform a method of:
  receiving from the client in characters included in the string a coding sequence whose elements corresponding to the characters are values encrypting a non-unity using a first encryption scheme having homomorphism, and whose elements not corresponding to the characters are values encrypting a unity using the first encrypting scheme;
  generating, in response to receiving the coding sequence, exchange data encrypting a subsequent state key corresponding to each of a plurality of previous states of the automaton based on the coding sequence using a first encryption scheme;
  encrypting exchange data with the corresponding previous state key; and
  sending the encrypted exchange data to the client.

18. A non-transitory program storage medium storing a program of instructions for causing the computer to execute the instructions to perform a method of:
  sending to a server, in characters included in a string, a coding sequence whose elements corresponding to characters are values encrypting a non-unity using a first encryption scheme having homomorphism, and whose elements not corresponding to the characters are values encrypting a unity using a first encrypting scheme; and
  receiving from the server ciphertext encrypting exchange data using a corresponding previous state key, the exchange data generated, in response to receiving the coding sequence, to encrypt a subsequent state key corresponding to each of a plurality of previous states of the automaton based on the coding sequence using the first encryption scheme.

* * * * *